(12) United States Patent
Dubois et al.

(10) Patent No.: US 12,014,432 B2
(45) Date of Patent: Jun. 18, 2024

(54) EXPANDABLE FEATURE AND LOCATION-BASED LISTINGS SEARCHES

(71) Applicant: Airbnb, Inc., San Francisco, CA (US)

(72) Inventors: Sebastien Pierre Romain Dubois, San Francisco, CA (US); Pauline Nguyen, Columbia Falls, MT (US)

(73) Assignee: Airbnb, Inc., San Francisco, CA (US)

( * ) Notice: Subject to any disclaimer, the term of this patent is extended or adjusted under 35 U.S.C. 154(b) by 287 days.

(21) Appl. No.: 17/522,590

(22) Filed: Nov. 9, 2021

(65) Prior Publication Data

US 2022/0374486 A1 Nov. 24, 2022

Related U.S. Application Data

(60) Provisional application No. 63/191,650, filed on May 21, 2021.

(51) Int. Cl.
| | |
|---|---|
| G06Q 10/02 | (2012.01) |
| G06F 16/587 | (2019.01) |
| G06F 16/906 | (2019.01) |
| G06F 16/9537 | (2019.01) |
| G06F 16/9538 | (2019.01) |
| G06Q 30/0601 | (2023.01) |
| G06Q 50/14 | (2012.01) |

(52) U.S. Cl.
CPC .......... *G06Q 50/14* (2013.01); *G06F 16/587* (2019.01); *G06F 16/906* (2019.01); *G06F 16/9537* (2019.01); *G06F 16/9538* (2019.01); *G06Q 10/02* (2013.01); *G06Q 30/0627* (2013.01)

(58) Field of Classification Search
CPC .. G06Q 10/02–10/025; G06Q 30/0641; G06Q 30/0643; G06Q 50/14
See application file for complete search history.

(56) References Cited

U.S. PATENT DOCUMENTS

| | | |
|---|---|---|
| 9,746,337 B2 | 8/2017 | Nesbitt |
| 10,303,725 B2 | 5/2019 | Charkov et al. |
| 10,453,226 B1 | 10/2019 | Burrows et al. |
| 10,643,263 B2 | 5/2020 | Wormhoudt et al. |
| 11,043,014 B2 | 6/2021 | Burrows et al. |
| 11,200,740 B1* | 12/2021 | Samuel ............ G06Q 30/0643 |
| 11,301,914 B2 | 4/2022 | Wormhoudt et al. |
| 11,687,959 B2 | 6/2023 | Abdallah et al. |
| 11,874,111 B2 | 1/2024 | Sumaria et al. |
| 2007/0255581 A1 | 11/2007 | Otto et al. |

(Continued)

OTHER PUBLICATIONS

O'Connor, Managing a Hotel's Image on TripAdvisor, Journal of Hospitality Marketing & Management, vol. 19, 201, pp. 754-772 (Year: 2010).*

(Continued)

*Primary Examiner* — Daniel Vetter
(74) *Attorney, Agent, or Firm* — Schwegman Lundberg & Woessner, P.A.

(57) ABSTRACT

A flexible feature and location-based listings system can provide accommodation listings using different feature categories and a location of the searching user. The returned listings can be modified upon providing the listings to a searching user. The returned listings can be modified in response to selection of a first feature category and re-modified in response to a second feature category in an expanded geographic search area.

20 Claims, 19 Drawing Sheets

(56) References Cited

U.S. PATENT DOCUMENTS

| | | | | |
|---|---|---|---|---|
| 2015/0061993 | A1* | 3/2015 | Itoh | G06Q 10/02 |
| | | | | 345/156 |
| 2018/0330283 | A1 | 11/2018 | Patel et al. | |
| 2020/0117326 | A1* | 4/2020 | Tokuchi | G06Q 10/02 |
| 2020/0233898 | A1* | 7/2020 | Barzelay | G06Q 30/0272 |
| 2021/0366015 | A1* | 11/2021 | Kurosawa | G06Q 10/02 |

OTHER PUBLICATIONS

Xing, et al., ArrayBridge: Interweaving declarative array processing in SciDB with imperative HDF5-based programs, 2018 IEEE 34th International Conference on Data Engineering, pp. 977-988 (Year: 2018).*

"U.S. Appl. No. 17/728,379, Non Final Office Action mailed Feb. 1, 2024", 18 pgs.

Koh, Wei Shun, et al., "Hotel Reservation Management System", Applied Information Technology And Computer Science vol. 2 No. 2 Universiti Tun Hussein Onn Malaysia Publisher's Office, (2021), 973-992.

"U.S. Appl. No. 17/728,379, Examiner Interview Summary mailed Mar. 25, 2024", 2 pgs.

"U.S. Appl. No. 17/728,379, Response filed Mar. 26, 2024 to Non Final Office Action mailed Feb. 1, 2024".

\* cited by examiner

EXPANDABLE FEATURE AND LOCATION-BASED LISTINGS SEARCHES

PRIORITY

This application claims the benefit of priority to U.S. Provisional Application Ser. No. 63/191,650, filed May 21, 2021, which is incorporated by reference herein in its entirety.

TECHNICAL FIELD

The present disclosure generally relates to special-purpose machines that manage data processing and improvements to such variants, and to the technologies by which such special-purpose machines become improved compared to other special-purpose machines for generating flexible listings searches.

BACKGROUND

Network site users can generate listings on a network site for viewing and interaction by other network site users (e.g., booking, registering, subscribing, viewing of the listings). The posted content can be updated, created, or deleted, and it can be computationally challenging for a network site to return valid search results to network site users searching for content within specified parameters (e.g., dates, categories, prices, quantity) that are not booked. Further difficulty arises when the searches are open-ended and the user would like to view different classes of listings that are still available but for different dates.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
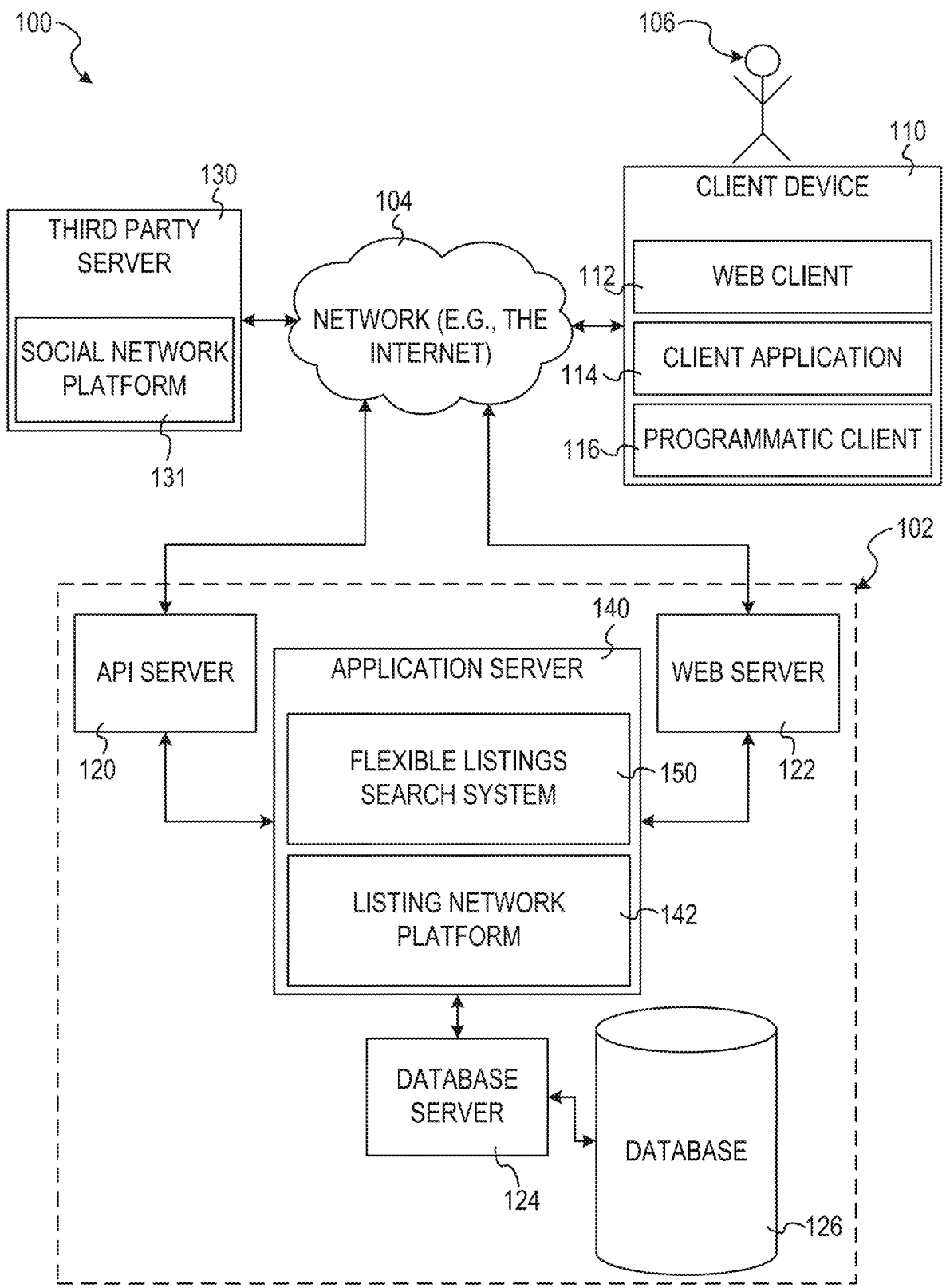
FIG. 1 is a block diagram illustrating a flexible listings search system implemented in a networked environment, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it can be difficult to perform searches for listings on a network site, where the searches are open-ended and the searching user seeks to view accurate search results for un-booked listings, where the listings may be in different class types, for different durations of stays that are in different date ranges of time, and further in different geographic areas. Conventionally, a user can narrowly search in each area, for each duration and date range, for the different class types; however, this yields a poor user experience and high-quality listings may never be surfaced to the searching user. Further complexity arises in the format of listings which are for accommodations (e.g., apartment, house, condo) and include images of the accommodation. Posting users that create the listings generally select an exterior photo of the accommodation as the default or primary photo of the listing, which is shown prominently in the listing's photo set and in a multi-listing search result set. A searching user may be interested in flexible destination searches, for different classes of listings, such as treehouse listings, listings with amazing pools, listings with amazing garages to host a football game party, listings of a cabin in the snow. For example, if the user is searching by keyword, e.g., "garage" to host a Super Bowl party, the results returned will not have their garage photos as the primary photos of the respective listings, because posting users generally do not put their accommodation's garage photo as the primary photo. Thus, a list of search results are shown, and the searching user must individually sort through the results (e.g., by opening each listing and searching through the listing's photos to see whether it has a satisfactory garage for a Super Bowl Party). Thus the highest quality results for that user are not surfaced, and more than a few search results will be skipped based on this clunky manner of searching. Additionally, if the searching user is searching for a certain class of listings that are rare, the geographic area included in the search may need to be adjusted, which makes the search process more unwieldly. For example, if the searching user switches their search for garages for a fun Super Bowl party to snowy cabins (e.g., cabin in the woods, covered in fresh snow), the search request may return no results or too many results, and each of those results would have to be manually explored to determine whether the listing has photos of a snowy cabin, as not all posting users are likely to select a snowy cabin as their primary photo.

To this end, a flexible feature and geographic location search system stores tagged photos that correspond to categories of different listings classes (e.g., Tiny Homes, Amazing Pools, Beachfront, Shipping Container Homes) where the classes may change seasonally or by time period. (e.g., Super Bowl or Olympics parties, snowy winter vacation). In some example embodiments, the flexible feature and geographic location search system receives a flexible feature-based search, adjusts the geographic search area to include a quantity of listings, and renders the listings with the tagged photo by replacing the primary default photo in the listing's search result window user interface at display time (e.g., in providing layout rendering to the client side). In this way, a searching user can flexibly search for accommodation listings by feature class in varying geographic areas, where each returned listing can rapidly be analyzed using the feature class tagged photo set as the primary photo based on the class type being searched.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110.

FIG. 1 illustrates, for example, a web client 112 (e.g., a browser), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box (STB), network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and reservation applications for temporary stays at hotels, motels, or residences managed by other end-users (e.g., a posting end-user who owns a home and rents out the entire home or private room). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application server(s) 140. The application server(s) 140 may host a listing network platform 142 and a flexible listings search system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., inventory, image data, catalog data) to the listing network platform 142. The database(s) 126 also stores digital goods information in accordance with some example embodiments.

Additionally, a social network platform 131 is illustrated as executing on third-party server(s) 130. Further, the social network platform 131 can programmatically access the networked system 102 via the programmatic interface provided by the API server 120. The social network platform 131 may comprise a social network website, messaging platform, and one or more APIs. In some example embodiments, the electronic message discussed below is a message sent to a given user via the social network platform 131 messaging system (e.g., social media chat message, post, ping (a "hello" notification), and so on).

The listing network platform 142 provides a number of publication functions and listing services to the users who access the networked system 102. While the listing network platform 142 is shown in FIG. 1 to form part of the networked system 102, it will be appreciated that, in alternative embodiments, the listing network platform 142 may form part of a web service that is separate and distinct from the networked system 102. In some implementations, the flexible listings search system 150 provides functionality to perform flexible date and destination queries, as discussed in further detail below.

While the client-server-based network architecture 100 shown in FIG. 1 employs a client-server architecture, the present inventive subject matter is, of course, not limited to such an architecture, and can equally be implemented in a distributed, or peer-to-peer, architecture system, for example. The various systems of the applications server(s) 140 (e.g., the listing network platform 142 and flexible listings search system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing and listing mechanisms whereby a seller (also referred to as a "first user," posting user, host) may list (or publish information concerning) goods or services for sale or barter, a buyer (also referred to as a "second user," searching user, guest) can express interest in or indicate a desire to purchase or barter such goods or services, and a transaction (such as a trade) may be completed pertaining to the goods or services.

Figure 2:
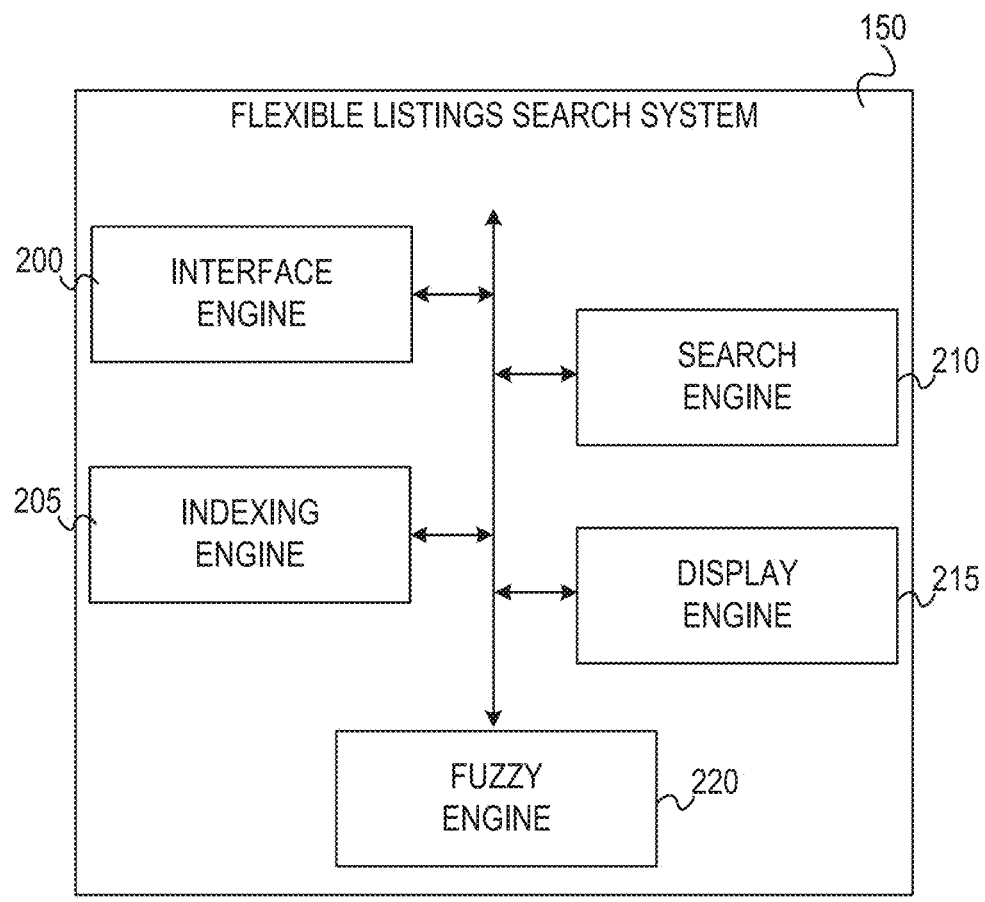
FIG. 2 shows an example of functional engines of a flexible listings search system, according to some example embodiments.

FIG. 2 shows example functional engines of the flexible listings search system 150, according to some example embodiments. As illustrated, the flexible listings search system 150 comprises an interface engine 200 to generate the user interface content (e.g., FIG. 3 to 8B), an indexing engine 205 to index data to be searched and generate pre-computed array index data, a search engine 210 to search, rank, and return results, a display engine 215 to display updated results (e.g., in different locations), and a fuzzy engine 220 to generate expanded results that can be combined with exact results, according to some example embodiments.

The interface engine 200 manages generating user interface elements and processing user interactions with the user interface content. The indexing engine 205 manages indexing data to be searched (e.g., via the search engine 210) and manages tagging one or more photos of each listing with feature category tags (e.g., FIGS. 8A, 8B, 12). In some example embodiments, the indexing engine 205 comprises a mapping module (e.g., to read offline data such as signals that are read from Hive tables and computed daily) and a reducing module (e.g., to receive updates per listing ID, compute an updated event, and send the updated data to the search engine 210).

The search engine 210 manages searching, ranking, and returning listing results. In some example embodiments, the search engine 210 comprises a root node search system that manages search request augmentation (e.g., getting user personalization data), aggregating results from different shards, and performing second pass ranking. Further in some example embodiments, the search engine 210 comprises a leaf node serving system that contains an inverted index (e.g., Apache Lucene) and can perform first pass ranking for different shards. In some example embodiments, the leaf node serving system reads a compressed matrix (e.g., pre-computed 3D matrix) into an in-memory data structure for rapid in-memory lookups.

Figure 3:
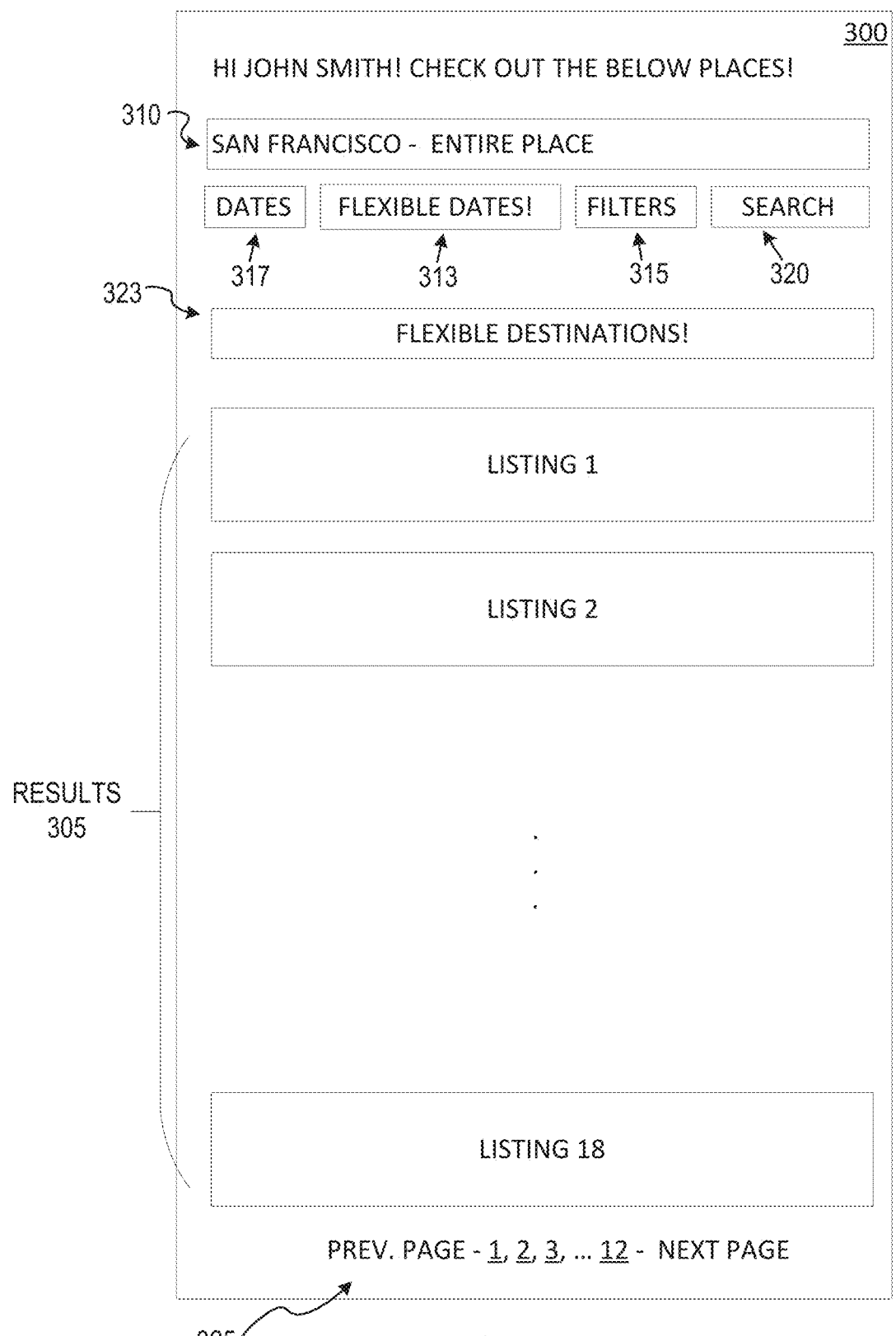
FIG. 3 shows a listings network site user interface generated by the listings network platform and flexible listings system, according to some example embodiments.

FIG. 3 shows a listings network site user interface 300 (e.g., mobile application user interface, web browser user interface) generated by the listing network platform 142 and flexible listings search system 150, according to some example embodiments. As illustrated, the user interface 300 includes a search field 310, a filters menu element 315 (e.g., place type, amenities), and a search button 320. The user enters a listings query into the search field 310, such as a search for temporary housing in San Francisco and a category limitation from the filters menu element 315 of "Entire Place" (e.g., the user seeks to rent the entire residence for said dates, as opposed to renting a private room in another person's residence). The user can customize the query directly using terms input into the search field 310 or filters listed via selection of the filters menu element 315. Further, the user can select dates using the dates drop-down element 317 to select a specific date range for the temporary stay. For example, the user can select the dates drop-down element 317 and a pop-up calendar (not depicted in FIG. 3) to specify the stay in San Francisco is to be specifically from Jul. 16, 2021, to Jul. 18, 2021.

The dates can also be selected in a flexible approach using the flexible dates element 313, according to some example embodiments. For example, the flexible dates element 313 can be implemented to search for listings that are approximate, e.g., plus or minus three days, five days, seven dates, or by one or more months, as discussed in further detail below. Upon submitting the query (e.g., via selection of the search button 320, or automatically upon selecting one or more dates using the flexible dates element 313 or dates drop-down element 317), the listings are displayed in the listings results area 305. The user can then select the listings or navigate to additional pages via page navigational elements 325.

The user interface 300 further includes a flexible destinations element 323 that can change the geographic parameter and listing types displayed in the listings results area 305. For example, the user can see an initial set of accommodations in San Francisco listed in the listings results area 305, and can update the location window by selecting "beach house" or "tree house" from the flexible destinations element 323, which causes an automatic update of the listings results area 305 and an update of a listings geographic map window (not depicted in FIG. 3; see FIG. 7B), as further discussed below.

Figure 4:
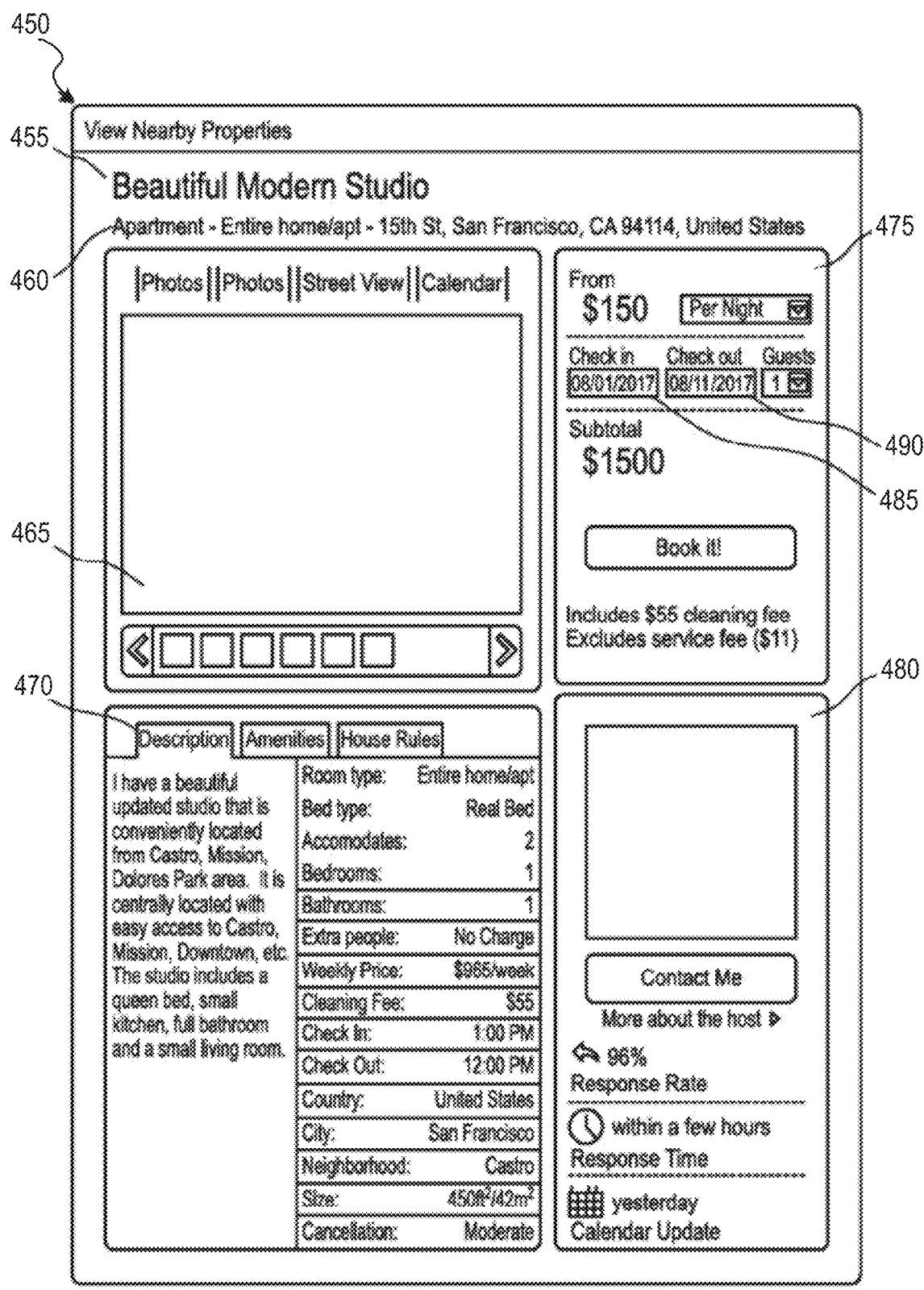
FIG. 4 illustrates an example user interface for a description of a listing for a rental item, according to some example embodiments.

FIG. 4 illustrates an example user interface 450 for a description of a listing for a rental item (e.g., an apartment in San Francisco posted to a listings network site by a posting user, for example, the apartment owner), according to some example embodiments. The user interface 450 is an example listing that can be displayed, for example, in response to the user selecting the first listing ("LISTING 1") in the listings results area 305 in FIG. 3. As illustrated, the example listing shown in FIG. 4 is for accommodations in San Francisco. In other examples, the listing could be for a tour, local experience, transportation, or other trip item. The listing may include a title 455 and a brief description 460 of the rental item. The listing may further include photos of the rental item, maps of the area or location associated with the rental item, a street view of the rental item, a calendar of the rental item, and so forth, which may be viewed in a primary area 465. In some example embodiments, the photo shown in the primary area 465 is selected by the posting user and is shown in the primary area 465 by default (e.g., upon clicking the listing for viewing). In some example embodiments, other photos included in the listing (e.g., shown below the primary area 465) can be scrolled to or clicked on directly for viewing in the primary area 465. The listing may include a detailed description 470, pricing information 475, and the listing host's information 480. The listing may further allow a user to update a date range for the rental item by entering or choosing specific check-in date element 485 and check-out date element 490. For example, the date range of FIG. 4 may be a flexible date generated by the flexible listings search system 150, and the user can modify the dates using the check-in date element 485 and check-out date element 490.

Figure 5:
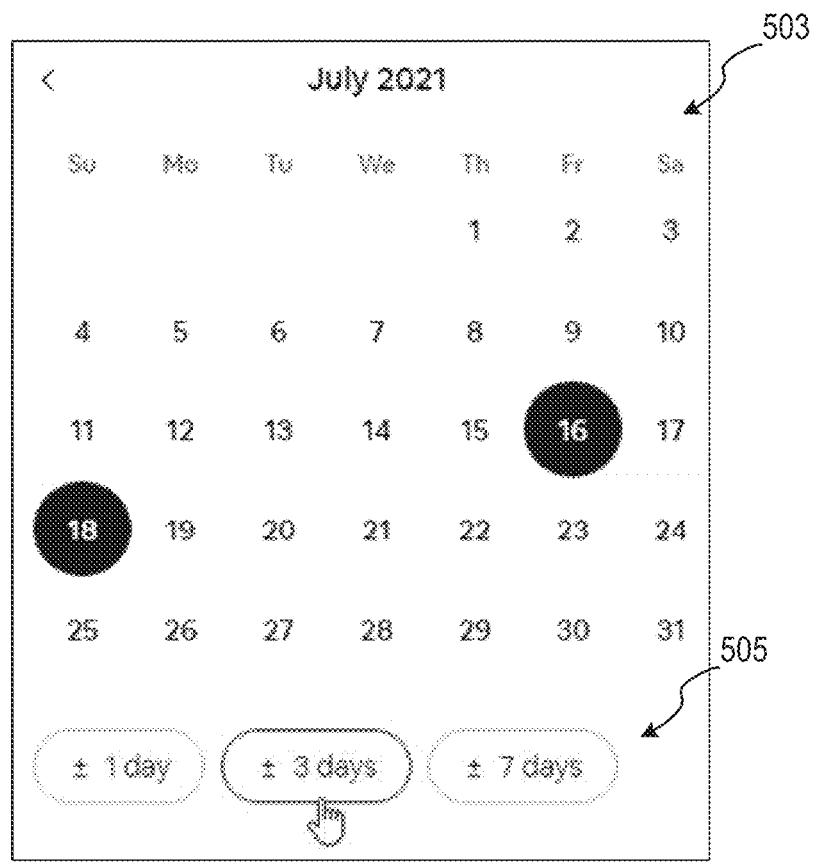
FIG. 5 shows a micro-flexible dates user interface, according to some example embodiments.

FIG. 5 shows a microflex dates user interface 500, according to some example embodiments. The user interface 500 can be generated as a calendar pop-up window that is displayed in user interface 300 in response to selecting the flexible dates element 313 of FIG. 3, in accordance with some example embodiments. The user interface 500 includes a calendar 503 and microflex date search elements 505 that can generate a flexible date query for varying date ranges (e.g., from Jul. 16, 2021, to Jul. 18, 2021, plus or minus three days; from Jul. 16, 2021, to Jul. 18, 2021, plus or minus five days; from Jul. 16, 2021, to Jul. 18, 2021, plus or minus seven days; and search, rank, and display results that satisfy any of the date ranges expressed), as discussed in further detail below.

Figure 6:
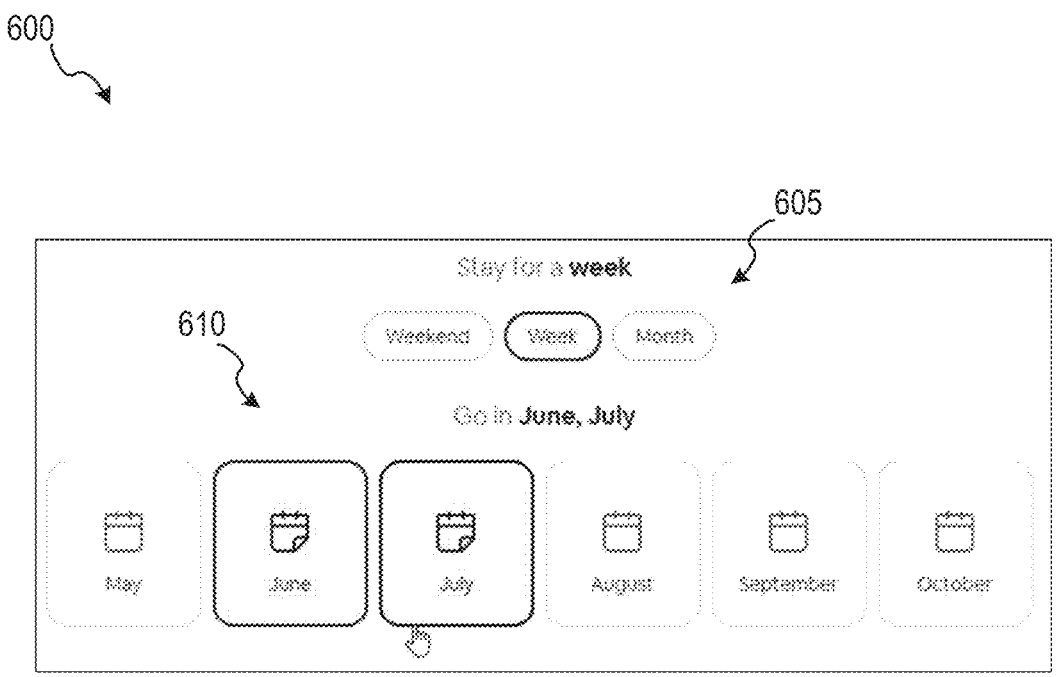
FIG. 6 shows a super-flexible dates user interface, according to some example embodiments.

FIG. 6 shows a super-flexible dates user interface 600, according to some example embodiments. The user interface 600 can be generated as a calendar pop-up window in the user interface 300 that is displayed in response to selecting the flexible dates element 313 of FIG. 3, in accordance with some example embodiments. The user interface 600 includes a duration window 605 to select an approximate date duration for a stay (e.g., stay for a weekend, stay for a week, stay for a month). The user interface 600 further includes a trip window 610 to select one or more months from the subsequent six months in which the selected duration elements should be implemented (e.g., stay for week, sometime in June and/or July; and search, rank, and display results that satisfy any of the date ranges expressed, where the subsequent six months are the next six months from the date of the user searching via user interface 300).

Figure 7A:
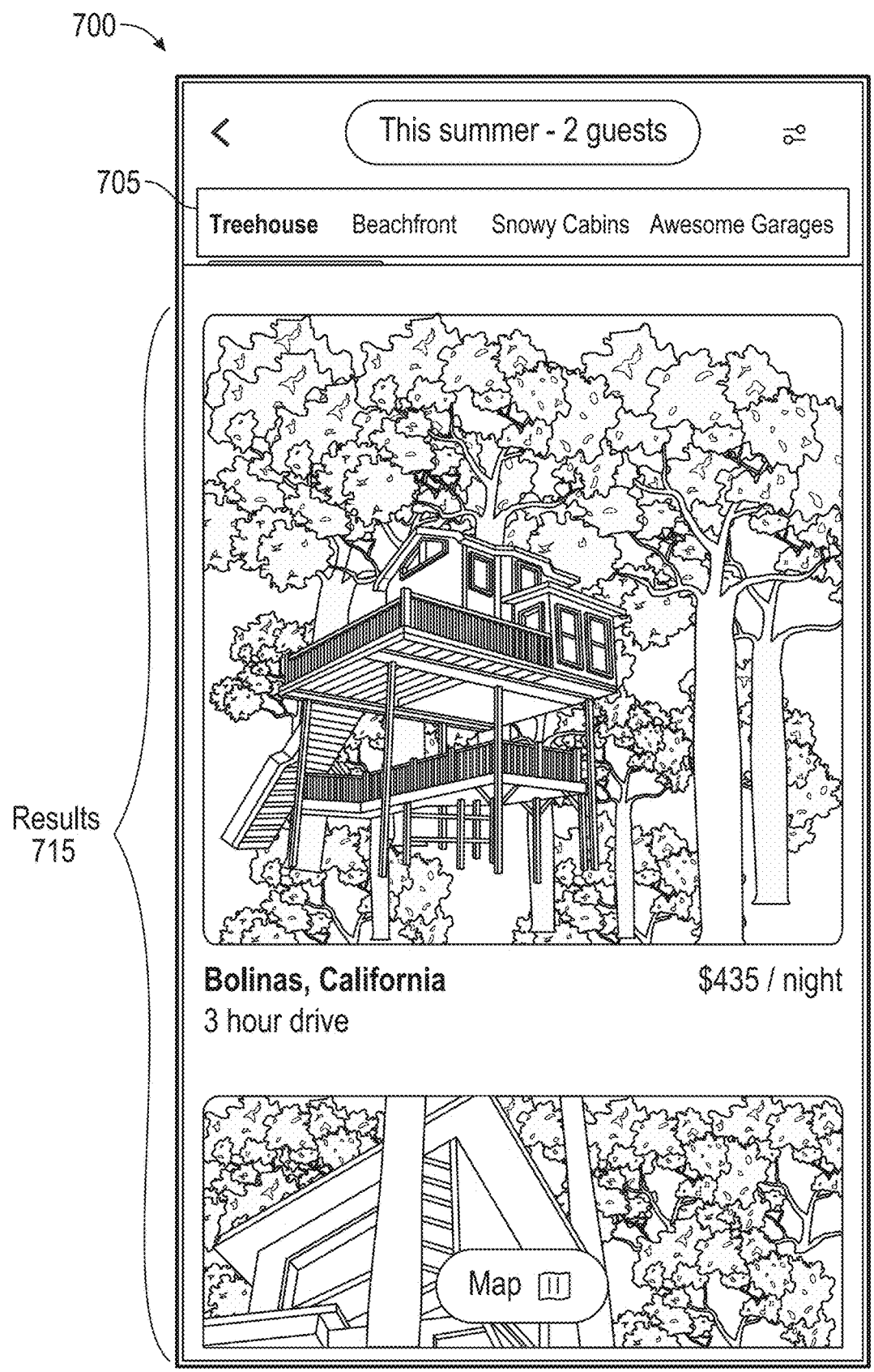
FIGS. 7A and 7B show example configurations of a flexible destination user interface, according to some example embodiments.
Figure 7B:
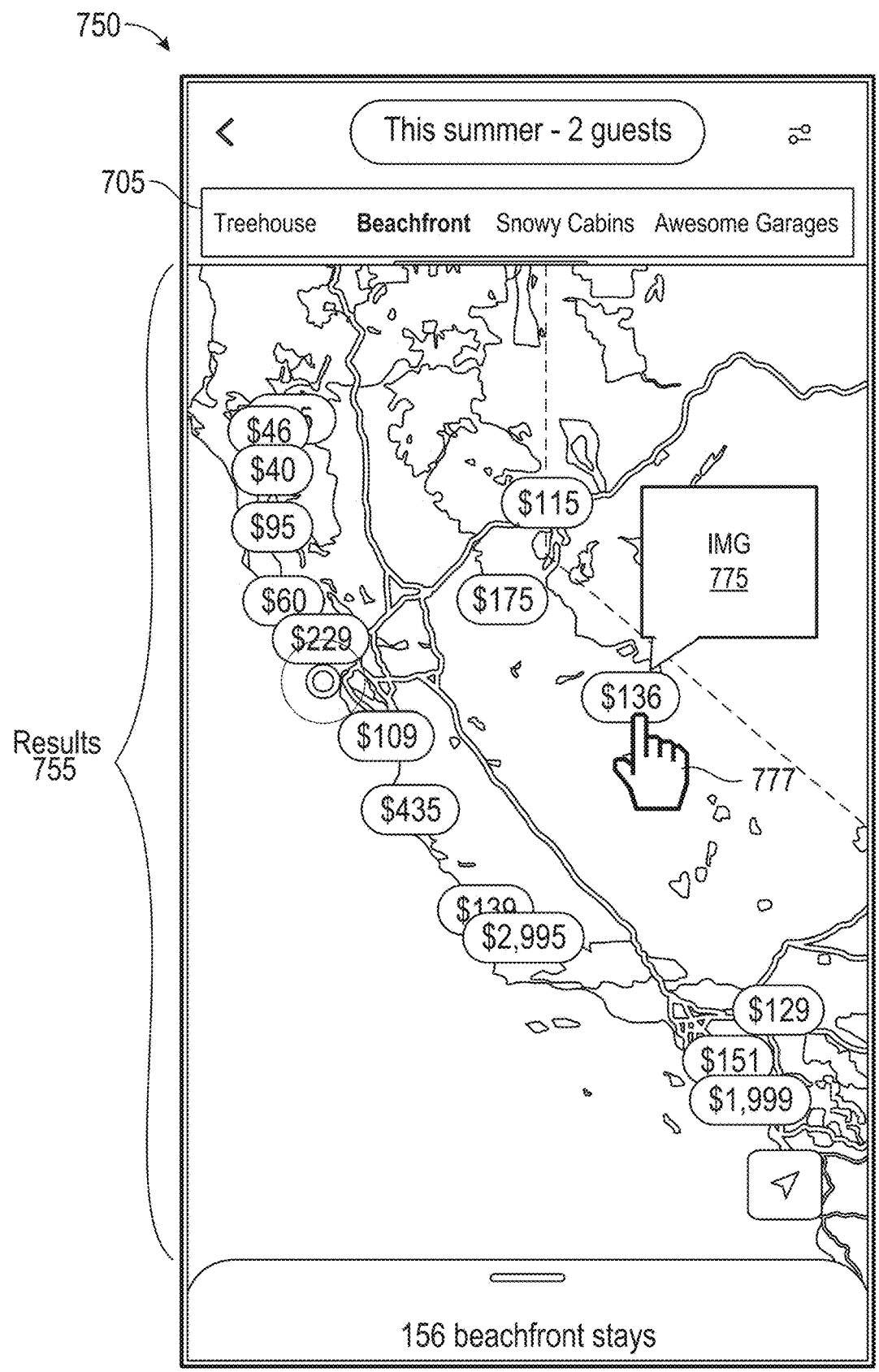

FIGS. 7A and 7B show example configurations of a flexible destination user interface 700, according to some example embodiments. The flexible destination user interface 700 enables a searching user to browse listings by categories near a searched location (e.g., San Francisco) and vary results based on category type and a dynamic geographic search area. In the illustrated example, the destination type selector 705 is an example of the flexible destinations element 323 of FIG. 3. In the illustrated example of FIG. 7A, the user is searching for a summertime stay (e.g., super flex search for the summer months: within June, July, and August), with the "treehouse" category selected in the destination type selector 705, which causes a super flex date and destination search, rank, and display of listings in the results area 715 (e.g., listings results area 305).

In some example embodiments, the user can switch to a map based flexible search user interface 753 to view the flexible results, as illustrated in FIG. 7B. In the map based flexible search user interface 753, in response to selecting the beachfront category being selected, new super flex date and destination results are searched, ranked, and displayed within a map results area 755. In some example embodiments, in selecting the different flexible categories, the map size adjusts to include different listings (e.g., for example, by zooming out in a map user interface to display more results of the new destination type (e.g., Pacific and Tahoe beach fronts), for the specified super flex date range summer)). Further, the user can hover over any of the results in the map based flexible search user interface 753 to cause a primary photo of the hovered-over listing to pop-up in the map based flexible search user interface 753, as illustrated by hand icon 777 and listing primary image pop-up 779, in accordance with some example embodiments. In this way, the searching user can browse by flexible category, flexible date range, duration of stay.

Figure 8A:
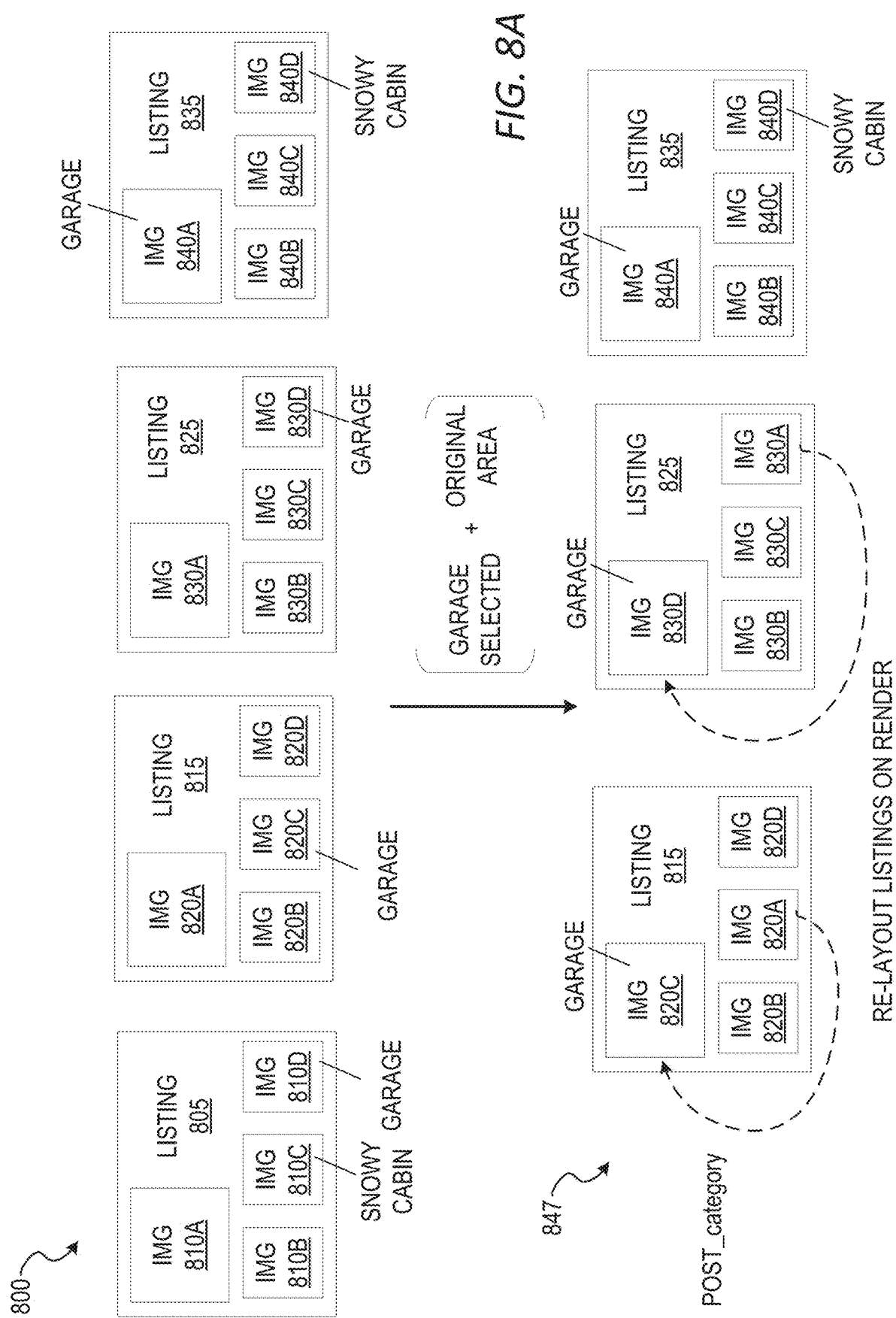
FIGS. 8A and 8B show data structures for implementing feature category and location-based listing searches, according to some example embodiments.

FIG. 8A shows a data architecture 800 for generating feature and geographic location-based searches in which a garage category is selected, according to some example embodiments. In the illustrated example, the listing 805, listing 815, listing 825, and listing 835 are accommodations listings, as discussed above. In some example embodiments, to enable flexible destination searches by feature class, one or more of photos of the listings are tagged with a metadata tag that assigns the given photo to a feature category (e.g., Amazing Pools, Treehouses, Beachfront, Super Bowl Party Garage, Snowy Cabins). The feature categories can be added, removed, or changed in response to accommodation trends (e.g., Tiny Houses, Yurts), weather (e.g., summer, winter, anomalous rainstorms), and events (e.g., a Super Bowl Party Garage feature category, for a given city's football team going to the Super Bowl), in accordance with some example embodiments.

In the example illustrated in FIG. 8A, the listing 805 comprises an image 810A of an accommodation of the listing 805. The image 810A is a default photo selected by the posting user that manages the accommodation of the listing 805 and created the listing 805 on the listings network platform 142. The image 810A occupies a primary photo area in the listing 805 (e.g., primary area 465, in FIG. 4), and as an automatic thumbnail image for a listing, as illustrated as illustrated by hand icon 777 and listing primary image pop-up 779 in FIG. 7B). The listing 805 further comprises image 810B and image 810C that are tagged as a snowy cabin image (e.g., exterior image of the accommodation of the listing 805 in which the accommodation is covered in fresh winter snow), and image 810D that is tagged as a garage image (e.g., image of an impressive garage that has a large TV and a billiards table).

The listing 815 comprises an image 820A of an accommodation of the listing 815. The image 820A is a default photo selected by the posting user that manages the accommodation of the listing 815. The image 820A occupies the primary photo area in the listing 815 and is the default listing for the listing as discussed above (e.g., shown in the primary photo area, and used as a thumbnail in search results with other listings). The listing 815 further comprises an image 820B and an image 820C that are tagged as a garage image (e.g., image of an impressive garage of the accommodation of the listing 815), and an image 820D.

The listing 825 comprises an image 830A of an accommodation of the listing 825. The image 830A is a default photo selected by the posting user that manages the accommodation of the listing 825. The image 830A occupies the primary photo area in the listing 825. The listing 825 further comprises image 830B, image 830C, and image 830D that are tagged as a garage image (e.g., image of an impressive garage of the accommodation of the listing 835).

The listing 835 comprises an image 840A of an accommodation of the listing 835. The image 840A is a default photo selected by the posting user that manages the accommodation of the listing 835. The image 840A occupies the primary photo area in the listing 835, and is tagged as a garage image (e.g., image of an impressive garage). The listing 835 further comprises image 840B, image 840C, and image 840D that are tagged as a snowy cabin image (e.g., exterior shot of a snow-covered cabin of the accommodation of the listing 835).

In some example embodiments, in a non-flexible or explicit accommodation search, a searching user may search for accommodations within a default distance of their location (or destination) that are available for specified dates, such as being located within 25 miles of San Francisco during New Year's Eve. In those example embodiments, the accommodations matching the specified explicit parameters are returned as search results. In contrast, a searching user can select a flexible destination category, and if a threshold quantity of accommodations (e.g., at least three) are in the default search distance (e.g., within 25 miles of San Francisco), the listings for the accommodations are re-generated with the tagged photo of the flexible destination category so that the tagged photo is displayed in the primary photo area of the default photo, and the re-generated listing is displayed to the user in the search results.

For example, in FIG. 8A, the user has selected Super Bowl Garage Party feature category, and the flexible listings search system 150 searches for accommodation listings that include a photo tagged with the requested feature category, and includes the matching listings in the result set. In the illustrated example, the data of listing 815, the listing 825, and the listing 835 is returned by the search engine 210 as the result set 847 for the searching user as they are within the default distance of the searching user's requested location (e.g., San Francisco). Further, the data of listing 805 is not included in the result set 847 even though it has a photo having a tag of the requested feature category because the listing 805 is for an accommodation that is outside the 25 miles default distance, and the minimum number of listings within the area has been satisfied (e.g., at least three listings), in accordance with some example embodiments.

In some example embodiments, the display engine 215 that generates the user interface data that displays the listings in the searching user's display device receives URLs for each of the listings (e.g., POST URL), where the URLs have a parameter (e.g., tag) that indicates that the listing is for a user that is viewing a requested flexible category. In response to determining that URLs of the returned result set listings have the parameter, the display engine 215 modifies the listing layout such that the tagged image replaces the default photo in the primary photo area of the listings. For example, the tagged image is displayed in the primary photo area when the listing is selected and displayed, and/or used as a thumbnail of the listing when the listing is shown in search results with other listings (e.g., in a results area 305, FIG. 3; in a map, FIG. 7B)

As an example, assume a default URL of listing 815 is www.website.com/listing815, the default URL of listing 825 is www.website.com/listing825, and the default URL of listing 835 is www.website.com/listing835. In an explicit search, the listing data of each listing is returned by the search engine 210 and the display engine 215 displays the listings using a default listings layout, where in response to selecting a given listing the listing page is shown with the default photo shown in the primary photo area, and if shown with other listings in a search results area the default photo is shown as a thumbnail for the listing. In contrast, in a flexible listing destination and location-based search where the category selected is Super Bowl Garage Party feature category, the data of the listings is returned by the search engine 210 as the result set, and the display engine 215 uses the parameter tagged category to modify the display of listings, without modifying the listing data stored in the database 126 (e.g., the posting user's selected primary image remains the default photo for other searches).

For example, the URLs of the listings can be changed to include a parameter tagged category in the POST URL. For instance, if the Super Bowl Garage Party feature category parameter is "8ks0dk", the URL of listing 815 is "www.website.com/listing815?8ks0dk", the default URL of listing 825 is "www.website.com/listing825?8ks0dk", and the default URL of listing 835 is "www.website.com/listing835?8ks0dk", in accordance with some example embodiments. Upon rendering the result set listings, the display engine 215 identifies the feature category parameter (e.g., "8ks0dk" for the Super Bowl Garage Party feature category), and changes the resulting layout so that the parameter tagged photo replaces the default photo in the primary area. In this way, the changes occur at the render level without modifying the data structure of the listing as configured by its posting user. In the illustrated example of FIG. 8A, the listing 815 is modified such that the garage photo of image 820C replaces default photo, image 820A, in the primary photo area of the listing 815; the listing 825 is modified such that the garage photo of image 830D replaces the default photo of 830A; and the listing 835 is not modified as the image 840A is the tagged garage photo and is already the default photo that is displayed in the primary photo area of the listing 835.

Upon clicking any of the listings in the flexible listings search results page (e.g., FIG. 3, FIG. 7B), the listing's POST URL is navigated to, whereby the parameter "8ks0dk" changes the layout for the parameter tagged photo as described above. Further, if the searching user sends the URL of the parameter tagged listing to another user, or saves it for themselves (e.g., a bookmark) for later viewing, the parameter in the POST URL is also saved and the garage photo will be displayed in the primary photo area any time the listing is displayed with the parameter tag in the POST URL (e.g., whereas removing the parameter tag causes the display engine 215 to display the listing with the original default photo in the primary photo area).

Figure 8B:
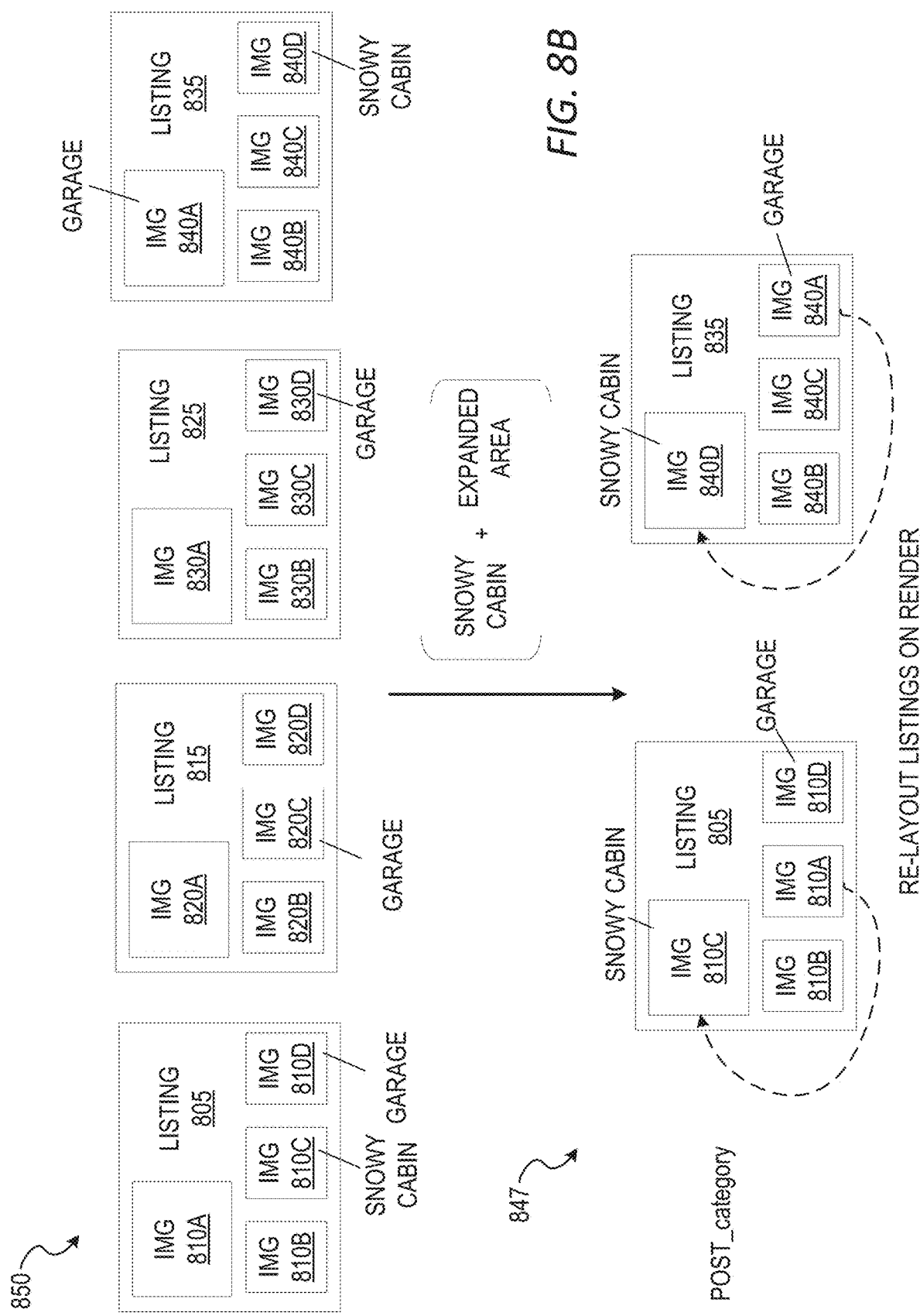

FIG. 8B shows a data architecture 850 for generating feature and geographic location based searches in which a snow cabin category is selected, according to some example embodiments. In the example of FIG. 8B, the season where the searching user is located is winter, and the snowy cabin feature category has been created and snowy cabin pictures are tagged to change how the listings are rendered if the snowy cabin category is selected. In particular, in FIG. 8B, the user has selected the snowy cabin feature category, and the flexible listings search system 150 searches for accommodation listings that include a photo tagged with the requested feature category, and includes the matching listings in the result set 847. In the illustrated example, the data of listing 805 and the listing 835 is returned as the result set 847 for the searching user even though the accommodation of listing 805 is outside the user's set search area of 25 miles. In these example embodiments in which the feature category is rare and few accommodations have tagged photos of the feature category, the flexible listings search system 150 adjusts the search area until a minimum number of results in the expanded area are found (e.g., at least two results). Upon the minimum number of listings in the expanded area being identified, the data of the listings is returned with a tag on the address of the listings such that the display engine 215 can change the layout of the listings per the newly requested feature category, as discussed above with reference to FIG. 8A.

For example, in FIG. 8B, the listing 805 is modified such that the snowy cabin tagged image 810C replaces the image 810A as the default photo (e.g., in viewing the listing or in a listings search result area, and the listing 835 is modified such that the image 840D of a snowy cabin replaces the default photo of 840A. In this way, the user can flexibly search for categories and view high-quality results that have relevant photos shown as default photos (e.g., in a primary photo area and used as thumbnails), without issuing further search queries and without permanently modifying the listings data in the database 126.

FIGS. 9-13B show example methods for implementing flexible listings queries (e.g., microflex search such as +/−five-day searches, super-flex date search, flexible date search, fuzzy searches, ranking and display), according to some example embodiments.

Figure 9:
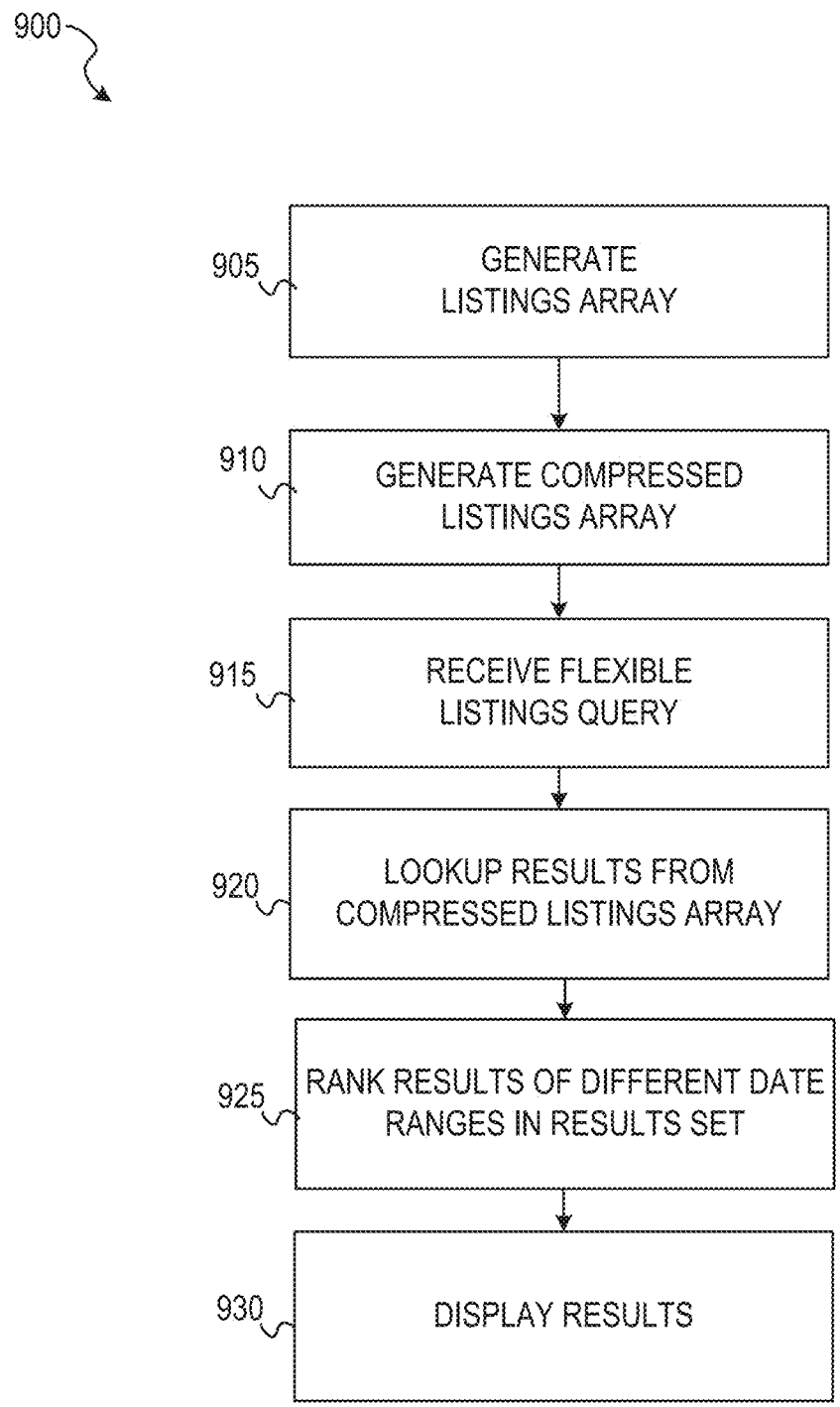
FIG. 9 shows a flow diagram of a method for flexible listings searches, according to some example embodiments.

FIG. 9 shows a flow diagram of a method 900 for flexible listings searches, according to some example embodiments. At operation 905, the indexing engine 205 generates a listings array. For example, to support flexible date searches without large computational overhead, the indexing engine 205 pre-computes the existing listings in an array, thereby moving computation from serving time to indexing time. In some example embodiments, the indexing engine 205 pre-computes and stores the listings array as a 3D matrix of prices for a large number of combinations across guest count, check-in date, and trip length (e.g., effectively guest count×booking periods) that cover a large amount (e.g., 90%) of end-user listings search requests. In some example embodiments, the matrix is computed across 1-16 guests, check-in dates of lead time 0-179, and length of stay 1-60 nights (e.g., creating a 3D matrix of 16*180*60, which covers 90% of listing queries).

In some example embodiments, when any listing gets created or updated by a posting user (e.g., homeowner listing a room or the entire home), the flexible listings search system 150 then re-computes all combinations in the indexing engine 205 (e.g., for the next six months, next 180 days) and forwards the recomputed values to the search engine 210. In this way, when a flexible listings request comes in, the search engine 210 can rapidly look up to 225 values in memory (e.g., within the 3D listings array), instead of computing the 225 values at serving time.

At operation 910, the indexing engine 205 generates a compressed listings array. In some example embodiments, storing the listings array, e.g., the precomputed price and availability for every possible listing, for each given listings possible (a) check-ins, (b) guest-count, and (c) trip-length combination, results in a 3D listings array matrix that has a memory footprint that can be so prohibitively large it cannot practically be used in a search. Additionally, the large footprint causes a long look-up time, which has a deleterious effect on the time savings gained by doing the precomputation in the first place. While some data structures support compressed bitmaps, these approaches do not support constant time look-ups (e.g., do not perform O(1) look-ups). Additionally, these approaches merely check for set membership (e.g., whether a listing exists, but not necessarily finding it), not a value look-up (e.g., look up and retrieve). Additionally, encoding mechanisms such as run-length encoding are less efficient as they only optimize for contiguous repetitions, while this mechanism is doing so globally.

To this end, the 3D listings array matrix is compressed into a highly compressed array using bitmaps, which reduces the footprint and decreases the look-up time (e.g., O(1) look-up time). Given that the prices are effectively stored in the compressed array and given that prices of listings tend to fall in a certain range, the listings data can be stored in a highly compressed format in the compressed array with 0(1) look-up time. In some example embodiments, at operation 910, the indexing engine 205 performs the following at indexing (e.g., anytime a listing is created or updated): (1) flattens the N dimensional data to one dimension; (2) sorts the data, dedupes the data, and finds the minimum number of bits required to represent a single unique price point (e.g., as opposed to the convention of using 32 bits to store any integer) and repeats for each price point, where each price point is then assigned a bit vector; and (3) stores a bitmap representation of the original array using the previous bit vectors, and further stores a look-up table mapping the bit vectors to corresponding price points. In this way, the array is compressed by eight or more times and more rapidly accessed, as discussed in operation 920. In some example embodiments, when listings are updated or new listings are added, the indexing engine 205 re-performs operations 905 and 910 to generate an updated compressed array.

At operation 915, the search engine 210 receives a flexible listings query. For example, the search engine 210 receives a microflex query generated using user interface 500 (FIG. 5), a super-flex query generated using user interface 600 (FIG. 6), and/or flexible destination query generated or modified using the flexible destination user interface 700 (FIGS. 7A and 7B), as discussed above.

At operation 920, the search engine 210 performs a lookup for results for the flexible listings query. For example, during serving time, the search engine 210 implements bit arithmetic to perform the following: (1) map the N dimensional query for a combination (e.g., check-in, check-out, guests) to an index in the ID bitmap; (2) look up the bit vector (e.g., using bit operations to find hits set, for example, from position i to position j, which represented the original price); and (3) transform the bit vector into the price via the look-up table.

At operation 925, the search engine 210 ranks the flexible listing results. As discussed, it can be difficult to perform flexible date queries. Additionally, many search engines cannot rank the returned flexible listings results. For example, in a microflex search, an implemented search model may not be configured to compare two listings that have different lengths of stay, and therefore can have vastly different total prices. For instance, given the query "Paris, 1 week this summer" the model cannot generate a prediction, based on historical data (e.g., historical listings posted and/or booked, and user data), on whether a guest would prefer (1) a $100/night listing June 1-7 (2) or a $90/night June 1-10. As an additional example, for a super flexible search (e.g., without base dates: check-in, check-out), a search model cannot surface appropriate results for the duration type (e.g., weekend, week or month) searched by the user. For a month-in-August query, a search model may return listings for any kind of stay (weekend, week, month).

In some example embodiments, the search engine 210 receives a super flexible search request. In contrast to a microflex search, a super flexible search does not have a single set of trip dates to search around; instead, there is a long list of trip dates that may be months away from each other and have drastically different trip lengths. To this end, the search engine 210 is configured to average a number of nights searched for, for all possible listings at operation 920, to return looked-up results. For example, in a previous approach, the search engine 210 can call a method: "getQueryNights {return number of nights between query checkin date and query checkout date}," where the method "getQueryNights" computes the number of nights queried, which is then passed to the ranking model of the search engine. Instead, at operation 920 the search engine 210 can call the method configured as: "getQueryNights {IF (is superflex search) return average number of nights of the possible dates of the super flex query, ELSE return number of nights between query checkin date and query checkout date}" (e.g., for monthly searches, instead of listings that are 28, 29, 30 and 31 nights long, the search engine 210 averages the lengths and the search is for 29.5 nights).

Additionally, and in accordance with some example embodiments, in ranking the results at operation 920, the search engine also computes price (as a feature for ranking) such that the price is based on listing-level trip length (e.g., multiple trip dates for each listing), instead of query-level trip length (e.g., only one trip date for each listing, for example as specified in the query). This ensures the price feature is correct; whereas previously, due to the dates for a flexible search not being set, the price may be computed as a dateless price that may be inaccurate.

For example, for a microflex query for July 14-16 (with +/−1):
(A) For a query-level trip length=2 nights, based on baseline dates, the following are results: [{listing A, July 14-15}, {listing B, July 14-16} and {listing C, July 14-17}],
(B) Whereas for respective listing-level trip lengths, the lengths are 1 for listing A, 2 for listing B, and 3 for listing C, in accordance with some example embodiments.

As an additional example, for a super flexible query for week in July:
(A) For a query-level trip length=0 nights because there are no query baseline dates, so show [{listing A, July 14-21}, {listing B, July 7-15} and {listing C, July 7-13}],
(B) Whereas for a respective listing-level trip length the results are 7 for listing A, 8 for listing B, and 6 for listing C, in accordance with some example embodiments.

In some example embodiments, to imitate price as a feature for ranking in the listing-level trip length approach, the search engine 210 calls the method "if (is superflex search) take first trip dates of the set of all trip dates and populate it as trip dates, to trigger dated price computation," according to some example embodiments.

At operation 930, the display engine 215 displays the flexible listing results (e.g., microflex results, super flex results, flexible destinations results, fuzzy results).

Figure 10A:
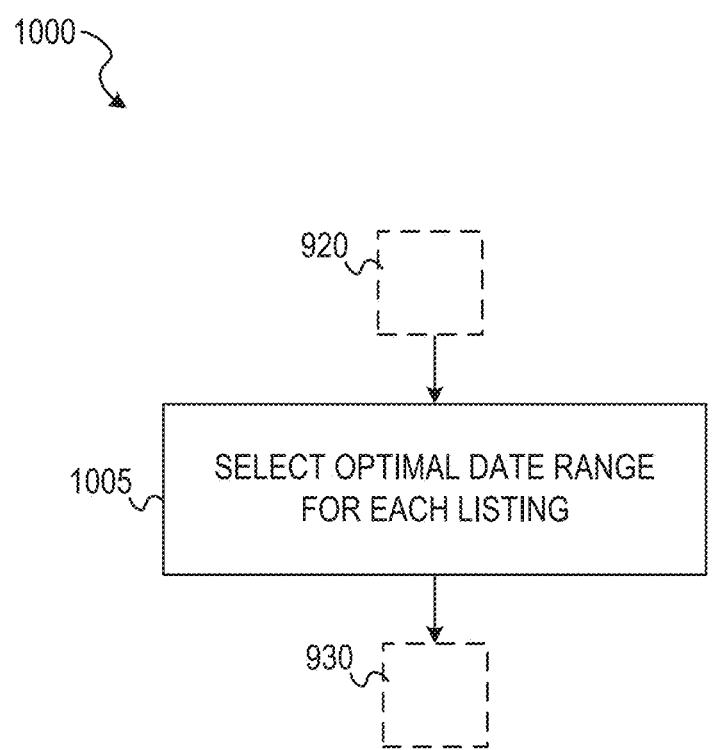
FIG. 10A shows a flow diagram of a method for selecting dates in flexible listings searches, according to some example embodiments.

FIG. 10A shows a flow diagram of a method 1000 for selecting dates in flexible listings searches, according to some example embodiments. In some example embodiments, the method 1000 is performed as part of operation 925 (e.g., sub-routine) in which the search engine 210 ranks the flexible listings results.

At operation 1005, the search engine 210 selects an optimal date range for each of the listings that are includable in a given flexible query. Operation 1005 can be performed to handle results in which one or more listings have different available results that are to be ranked. For example, for a search for "weekend in June or August," a given listing might be available for multiple weekends in June or August. To this end, the search engine 210 is configured to perform operation 925 to select the best possible date range for each given listing, which is then passed to the ranking module (e.g., code set running the operation 925), which then ranks the listings for display.

In some example embodiments in which the query is a microflex query (e.g., the user inputs a base date range of February 15-22, and a degree of flexibility around the dates, such as +/−3 days), the search engine 210 iterates, in a fixed order, to return results for different potential dates that are close to the baseline dates. For example, the search engine 210 can search for the dates with the least differences from the original dates (e.g., in terms of length of stay and check-in date) and select the first available date range in the iterative search.

In some example embodiments in which the query is a super flex query (e.g., the user inputs an approximate duration (weekend, week, month) and a time window (August only, June to August, June or August, etc.)), the search engine 210 stratifies the date selection in a listing-level randomized approach. In some example embodiments, at operation 1005, for length-of-stay stratas, the search engine 210 enforces a priority on the different duration types (weekend, week, or month) in terms of length of stay. For example, for a "weekend" stay the search engine 210 uses only "2 nights" visibilities for a given listing. Further, for a week stay, it prioritizes 7-night stays over 5-night stays at a given listing, and prioritizes 5-night stays over 6-night stays at the given listing (e.g., where in selecting 7-night availabilities, the remaining 5-night and 6-night availabilities are thereby removed if they overlap or conflict). Further, for a month stay, it prioritizes 30-night stays, 28-night stays, then 29-night stays. In some example embodiments, each listing is included in the displayed results once with the first available date range from the list of available ranges in order of the pre-configured learned priority. In alternative example embodiments, each availability for a given listing is included in the displayed results but in the order of priority (e.g., ranked higher in results is a 7-night stay over a 5-night stay for a single listing).

In some example embodiments, the prioritization is pre-configured based on learning historical booking patterns of previous listings. For example, the search engine 210 runs a one-off offline data analysis to compute the aggregation of the historical logged listing and bookings data (e.g., grouping and ranking 30 days of historical bookings per number of nights).

In some example embodiments, to implement randomization within the different stratas, the search engine 210 shuffles the list of possible dates, within each given length of stay, where the shuffling seed is different for each listing. In some example embodiments, for each listing, the search engine 210 randomly shuffles the date ranges using the visitor ID (e.g., username, ID of the searching user) and the listing ID as a seed to ensure stability of the randomization and improve diversity of date ranges shown to the user. Finally, the search engine 210 selects, for each listing, the first available date in the stratified randomized list, which can then be looked up and ranked (e.g., the subroutine ends and returns data).

Figure 10B:
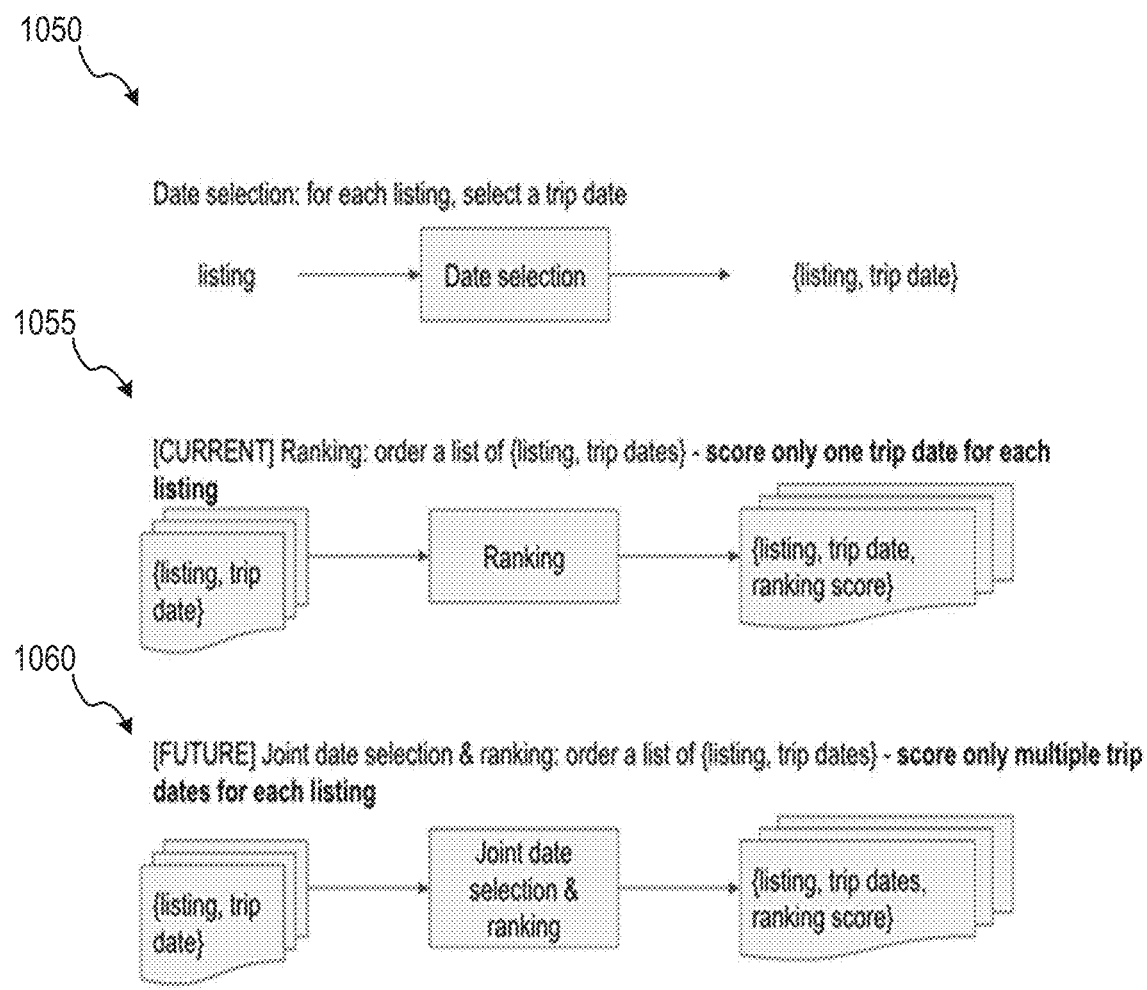
FIG. 10B shows an example data flow for different flexible searches, according to some example embodiments.

FIG. 10B shows an example of data flow for different flexible searches implemented by operation 1005.

In the flow 1050, for each listing, a date is selected (e.g., as specified by searching user) and {listing, trip date} is scored, according to some example embodiments.

in flow 1055, the ranking orders a list of listings and trip dates (e.g., a set of {listing, trip date}), and only one trip date for each listing is scored (e.g., a set of {listing, trip date, ranking score}).

In flow 1060, joint date selection and ranking is performed (e.g., a set of {listing, trip dates}), and multiple trip dates for each listing are scored (e.g., a set of {listing, trip dates, ranking score}) to complete both microflex and super flexible searches jointly.

Figure 11:
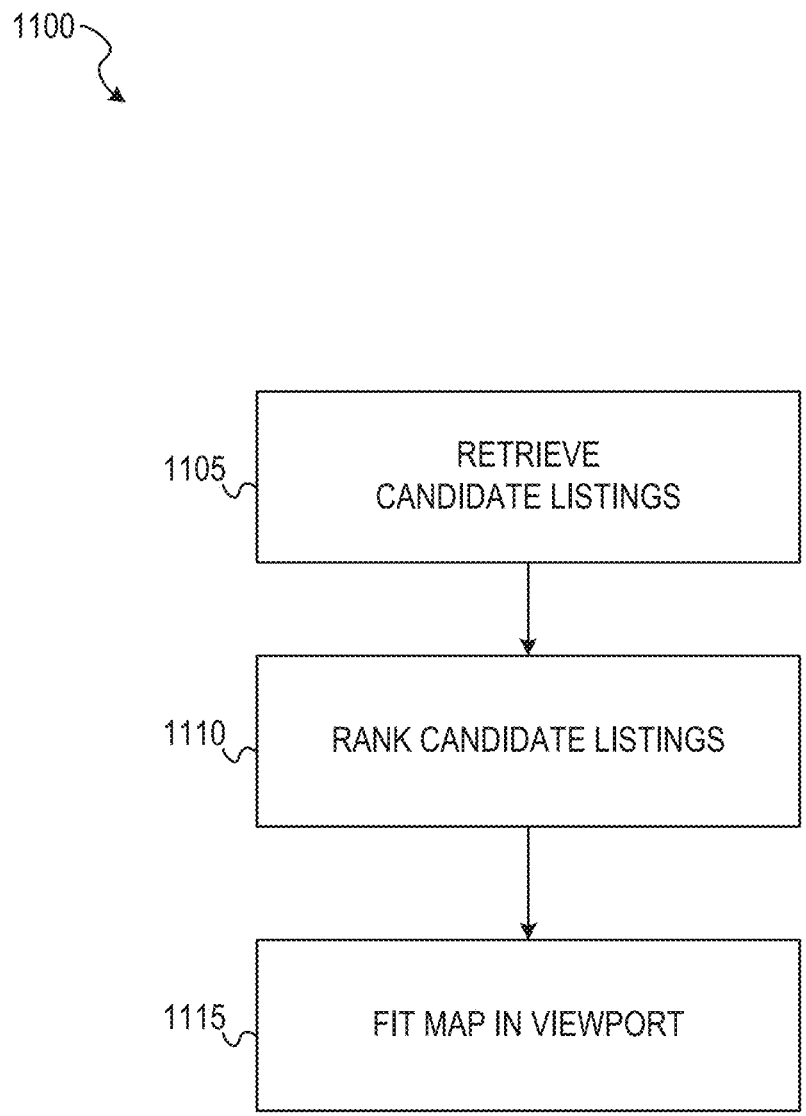
FIG. 11 shows a flow diagram of a method for performing flexible destination queries, according to some example embodiments.

FIG. 11 shows a flow diagram of a method 1100 for performing flexible destination queries (e.g., FIG. 7A, FIG. 7B), according to some example embodiments. In some example embodiments, the method 1100 is performed as part of operation 920 (FIG. 9) in which the flexible listings search system 150 searches and generates listings for a flexible query (e.g., super flexible date search for a summer months stay, with a listing category of beachfront or treehouse selected). In some example embodiments, the method 1100 is performed independently of the flexible date approach, for example, as in a search specifying specific dates, but with flexible destinations.

One issue for flexible destination searches is that the available supply for unique listing categories (like "treehouse," "island," etc.) can vary significantly depending on location and selected filters, and it can be difficult to ensure that sufficient high-quality results are returned (e.g., using previous search patterns). For example, an end-user based in San Francisco can initiate a search using a map (e.g., FIG. 7B) to search for nearby listings. The user can move the viewport of the map to the coast because the end-user is interested in accommodations in or near lighthouses. However, due to low inventory of those types of specific accommodations, the end-user is forced to zoom out of the map multiple times and search in the zoomed-out area to return refreshed results until the user finds results of sufficient interest. If, while the map is zoomed out, the user then decides to search for tiny house accommodations (which have much more supply and thus, more listings), the end-user then has to zoom back into San Francisco to narrow the search (e.g., instead of looking at results all over the United States, which was necessary for the lighthouse accommodation searching).

To this end, the display engine 215 can perform flexible destination searches using the map, where the search bounding box is used to provide user inputs (e.g., location and current viewport) as signals, instead of hard requirements. In this approach, the display engine 215 automatically zooms the map in or out to display high-quality results based on the location and availability (e.g., and any additional filters, such as "Entire Place," "Laundry").

At operation 1105, the display engine 215 retrieves all candidate listings within a very large area around the search center. In some example embodiments, the display engine 215 implements offline data to pick a retrieval area (e.g., S2 cells of S2Geometry) that is only as large as needed, and implements a statically sorted index (e.g., Lucene index) to retrieve best listings first. In some example embodiments, the Lucene index is sorted with a static score (e.g., based on impressions, clicks, occupancy rate) that is updated daily, according to some example embodiments. In this way, the static score can be implemented to rapidly surface high-quality or more desirable listings (e.g., the higher the score, the more desirable the listing). Additionally, while the offline data may not be up to date, and the availability only approximate, the offline data enables a significant performance gain for flexible destination because the display engine 215 uses the offline data to precompute the bounding boxes for different geographic areas ahead of time (e.g., before a given search within an area is received) instead of at the time the search is received. Additionally, the retrieval area (e.g., S2 cell) is set to as large as needed, where the minimum number of listings is preconfigured as N (e.g., return 10 treehouse listings) and then the display engine 215 computes a smallest bounding box (e.g., S2 cell) that satisfies the requirement of having N listings available.

At operation 1110, the display engine 215 ranks the candidate listings by balancing between relevance, quality, and distance using machine learning models. In some example embodiments, the ranking at operation 1110 is performed by (1) retrieving all eligible listings, where the index is sorted based on quality of listing signals (e.g., at operation 1105); (2) perform first-pass ranking to select a top N (e.g., top 801) results based on a model that predicts likelihood of booking (trained on historical booking data) and the distance from the user to each given listing; and (3) perform second-pass re-ranking and filtering based on weighted signals. In some example embodiments, the second-pass ranking identifies a bounding box formed by the closest X listings (e.g., top 7 of the 800), and then re-ranking the listings within that bounding box based on the quality of signals.

At operation 1115, the map bounds are fitted by the display engine 215 to display a set of the top results. For example, the map boundaries in the viewport are modified such that the map displays the top 7 results of the candidate listings ranked at operation 1110. In some example embodiments, in modifying the map in the viewport, the location context is preserved to ensure that the modifying of the map does not disorient the viewing user (e.g., jump from a zoomed-in display of results in a given city to another zoomed-in display of results of a different city). For example, the display engine 215 disables zooming in if the user's location is not in the viewport. Additionally, the display engine 215 maintains the user location such that it must be shown in the viewport (or previous viewport) within the bounds to avoid jumping the viewport to another area (e.g., that excludes the user's location, which previously resulted in user disorientation).

Figure 12:
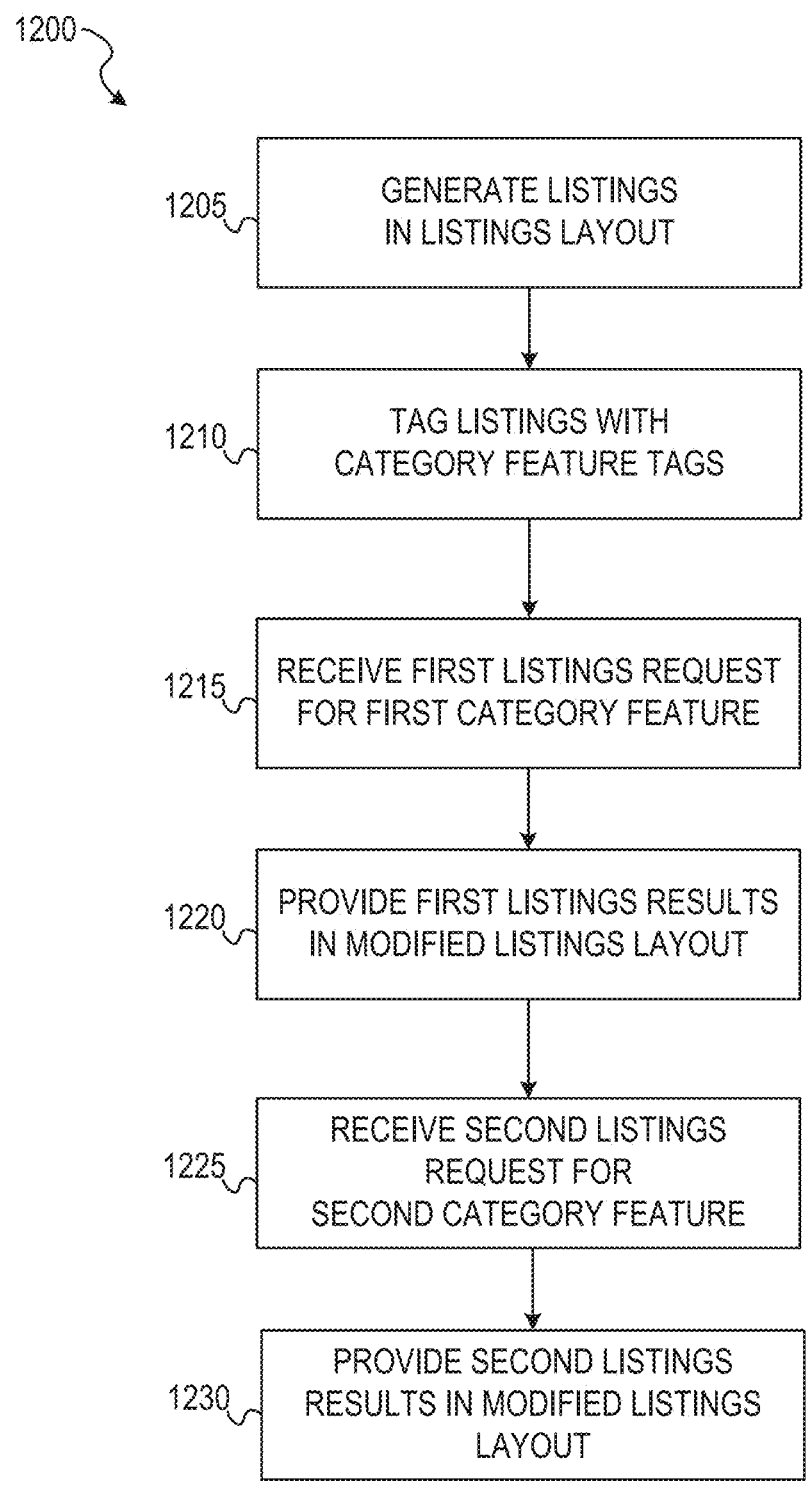
FIG. 12 shows a method for feature category and location-based searches, according to some example embodiments.

FIG. 12 shows a flow diagram of a method 1200 for providing feature and location-based listings results, according to some example embodiments. At operation 1205, the flexible listings search system 150 generates listings in a listings layout. For example, the flexible listings search system 150 receives listings data (e.g., accommodation details, photos, location) from a plurality of posting users and generates listings that are stored in the database 126. As discussed, the listings can be searched via search engine 210 and displayed in a listings layout (e.g., in which the default photo selected by a given posting user is shown as the listing's primary photo and thumbnail photo).

At operation 1210, the flexible listings search system 150 tags one or more photos of each listing with feature categories, as discussed above (e.g., garage, snowy cabin, amazing pools). In some example embodiments, the indexing engine 205 implements a machine learning identification system (e.g., classification convolutional neural network) to automatically classify an image into a feature category (e.g., identify an image as a photo of a garage) and tag the image with a metadata tag of the classified feature category (e.g., tag with the garage feature category). In some example embodiments, the photos are manually tagged by administrative users of the networked system 102 (e.g., administrative user individually tags photos in assorted listings that have impressive pools with the "amazing pools" tag).

At operation 1215, the flexible listings search system 150 receives a first listings request for a first category feature (e.g., receives a feature and location-based request for listings having amazing garages). At operation 1220, the flexible listings search system 150 provides the first listings results in a modified listings layout. For example, the flexible listings search system 150 identifies listings having a photo with the feature category of garage, and displays the listings as search results in the modified listings layout, as discussed above with reference to FIG. 8A.

At operation 1225, the flexible listings search system 150 receives a second listings request for a second category feature (e.g., receives a feature and location-based request for listings that are snowy cabins). At operation 1230, the flexible listings search system 150 provides the second listings results in a modified listings layout. For example, the flexible listings search system 150 identifies listings having a photo with the feature category of snowy cabin, and displays the listings as search results in the modified listings layout, as discussed above with reference to FIG. 8B.

Figure 13A:
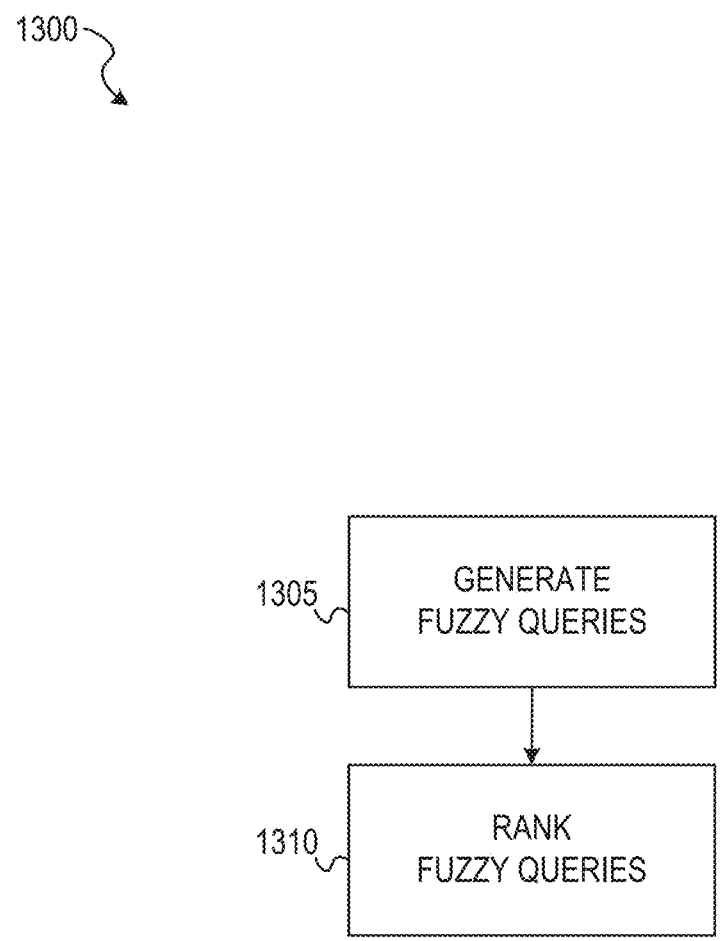
FIG. 13A shows an example flow diagram of a method for generating fuzzy query listings results, according to some example embodiments.

FIG. 13A shows an example flow diagram of a method 1300 for generating fuzzy query results, according to some example embodiments. In some example embodiments, the method 1300 is performed in parallel to method 900 and fuzzy-listing results are added to the results displayed at operation 930 (e.g., appended to the end of the results to be shown on the second or third page of the results). The fuzzy engine 220 can generate fuzzy results, which are not exact matches but are slightly different based on filters, prices, or other dimensions (fuzzy), which can broaden the type of results returned in a flexible search.

At operation 1305, the fuzzy engine 220 generates fuzzy-listing results in response to a query. In some example embodiments, the fuzzy engine 220 implements a query rewriter that examines a received query (e.g., operation 915) and generates multiple rewrites of the query based on past user history (e.g., of the user that generated the query), the location searched for, while keeping some filters (e.g., filters related to safety of the accommodation area) as not relaxable and hard requirements in each of the rewrites. In some example embodiments, the rewritten queries are transformed in a shard into parallel Lucene queries, and the parallel search engine queries retrieve different fuzzy results, which are then aggregated for ranking at operation 1310.

At operation 1310, the fuzzy engine 220 ranks the fuzzy queries (e.g., ranks and displays them independently, or appends the queries to the end of the flexible date/destination results generated by method 900). In some example embodiments, the fuzzy engine 220 performs the ranking in a first pass ranking and a second pass ranking.

First-pass ranking: In this ranking stage, the fuzzy engine 220 evaluates each listing with respect to the original query and each rewritten (or relaxed) query. In some example embodiments, the fuzzy engine 220 implements a machine-learning scheme to perform the first-pass scoring, which takes the original query filters, relaxed query filters and filters satisfied by the listing into account. The fuzzy engine 220 then implements the model to initiate tradeoffs between listing location (e.g., distance to user that submitted the query's location), quality (e.g., rating, number of reviews), price, and filters that were kept or relaxed.

Second-pass ranking: In the second-pass ranking stage, the fuzzy engine 220 initiates tradeoffs at the set level (e.g., price vs. 1-amenity relaxed vs. 2-amenity relaxed listing) after the fuzzy engine 220 aggregates the different results from the first-pass ranking. In some example embodiments, a relax-by-1 example includes listing price=$240 when max_price=$200; an additional example includes listing_amenities=[pool, wifi] when query_amenities=[pool, wifi, hottub]. In some example embodiments, a relax-by-2 example includes listing_amenities=[wifi] when query_amenities=[pool, wifi, hottub].

In some example embodiments, the fuzzy engine 220 applies re-ranking rules such that relax-by-1 listings appear before relax-by-2 listings. In some example embodiments, after a second-pass ranking, the display engine 215 displays the fuzzy results (e.g., appending them after the non-fuzzy results). In some example embodiments, the fuzzy results are dispersed in the exact query results in a single feed (e.g., where the results for the exact query are of low quality, relevance, supply).

Figure 13B:
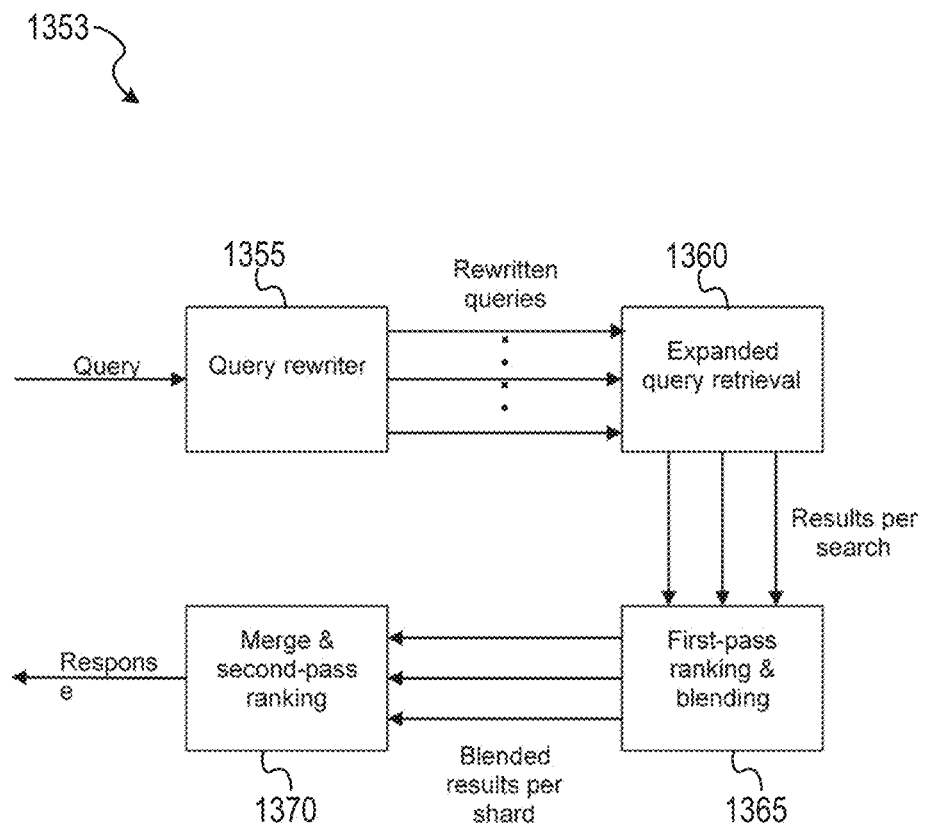
FIG. 13B shows an example engine architecture implemented in a display engine to implement fuzzy listings queries, according to some example embodiments.

FIG. 13B shows an example engine architecture 1353 implemented in display engine 215 to implement fuzzy queries, according to some example embodiments. In the example illustrated, the query rewriter 1355 rewrites a received query (e.g., {location=San Francisco, max_price=200, amenities=[pool, hottub, wifi]}) to generate multiple rewritten queries (e.g., a price-relaxed query: {location=San Francisco, max_price=250, amenities=[pool, hottub, wifi]}; an amenities-relaxed query: {location=San Francisco, max_price=200, amenities=[wifi]}), which are then searched for using the expanded query retrieve engine 1360. In some example embodiments, the price is relaxed based on historical trends of previous users that completed bookings (e.g., the price is relaxed by approximately 20%), and a number of queries are rewritten for amenity-relaxed queries, where any amenity that is not related to safety of a listing, accessibility (e.g., ramp, parking) or other amenities (e.g., crib, heating, cooling) is relaxed in one or more of the rewritten queries.

The expanded query retrieve engine 1360 generates results per each search (e.g., per each rewritten query). The first-pass ranking engine 1365 then performs first-pass ranking as discussed above. The first-pass ranked results are then blended per shard (e.g., the set is unionized) and undergo second-pass ranking via the second-pass ranking engine 1370, which generates the fuzzy results.

In some example embodiments, the query is converted into an embedding space to find fuzzy search embeddings that correspond to queries that can be implemented as fuzzy queries. In some example embodiments, a hierarchical navigable small world (HNSW) graphs scheme is implemented to perform K-nearest neighbor search for the embeddings in a neural network.

In some example embodiments, HNSW uses small-world graphs, which heavily relies on the embedding space being multi-layered and clustered within a layer. Given many real-world graphs have this property, in some example embodiments, the fuzzy engine algorithm is able to greedily traverse the graph in poly logarithmic time with high recall.

In some example embodiments, the fuzzy engine 220 implements multiple HNSW indices, one per up to K-listings in an S2 cell between levels A (specific query parameters) and B (fuzzy). In some example embodiments, the fuzzy engine 220 implements an indexing algorithm that partitions the world into S2 cells with up to K-listings each. For example, the S2 cells will be at a higher level (smaller) in densely populated areas with many listings and will be at a lower level (larger) in less densely populated areas. Further, for a query to find N listings, the fuzzy engine 220 will first find the minimum set of S2 cells that cover the input polygon (e.g., S2RegionCoverer).

In some example embodiments, to perform filtering, the fuzzy engine 220 implements bitmaps (e.g., Roaring Bitmaps) to co-locate facet data per listing for filtering in an HNSW node. In some example embodiments, the bitmaps are compressed bitmaps, and support a "contains(filter)" API for filtering. At indexing time, the bitmap will be initialized and stored along with the HNSW node. A node update that does not update the embedding will only update the data stored in a HNSW node, in accordance with some example embodiments.

Figure 14:
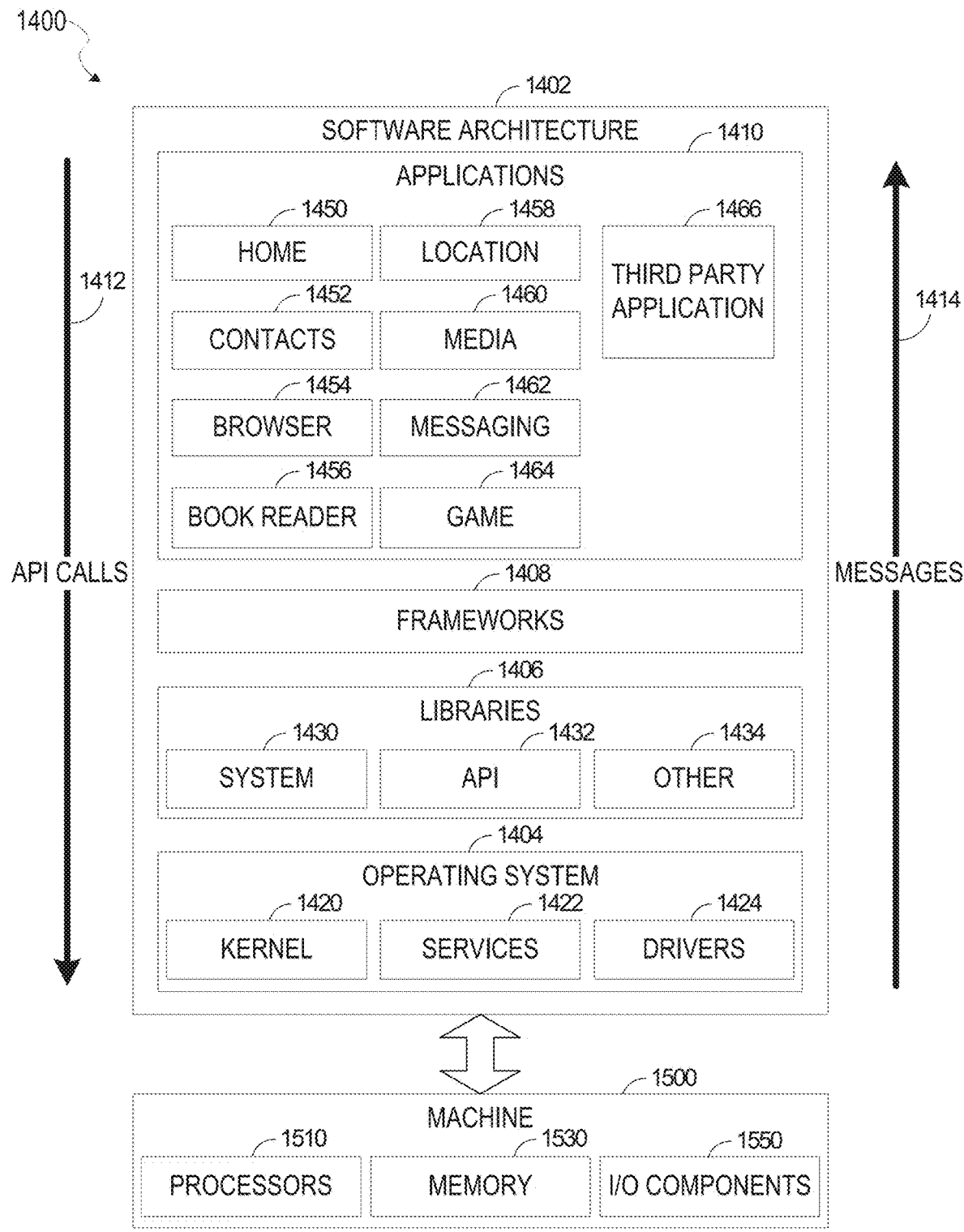
FIG. 14 is a block diagram illustrating the architecture of software used to implement the user messaging system, according to some example embodiments.

FIG. 14 is a block diagram 1400 illustrating an architecture of software 1402, which can be installed on any one or more of the devices described above. FIG. 14 is merely a non-limiting example of a software architecture, and it will be appreciated that many other architectures can be implemented to facilitate the functionality described herein. In various embodiments, the software 1402 is implemented by hardware such as a machine 1500 of FIG. 15 that includes processors 1510, memory 1530, and input/output (I/O) components 1550. In this example architecture, the software 1402 can be conceptualized as a stack of layers where each layer may provide a particular functionality. For example, the software 1402 includes layers such as an operating system 1404, libraries 1406, frameworks 1408, and applications 1410. Operationally, the applications 1410 invoke API calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an. OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that, can be utilized by the applications 1410, some of which may be specific to a particular operating system or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third-party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third-party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1466 can invoke the API calls 1412 provided by the operating system 1404 to facilitate the functionality described herein.

Figure 15:
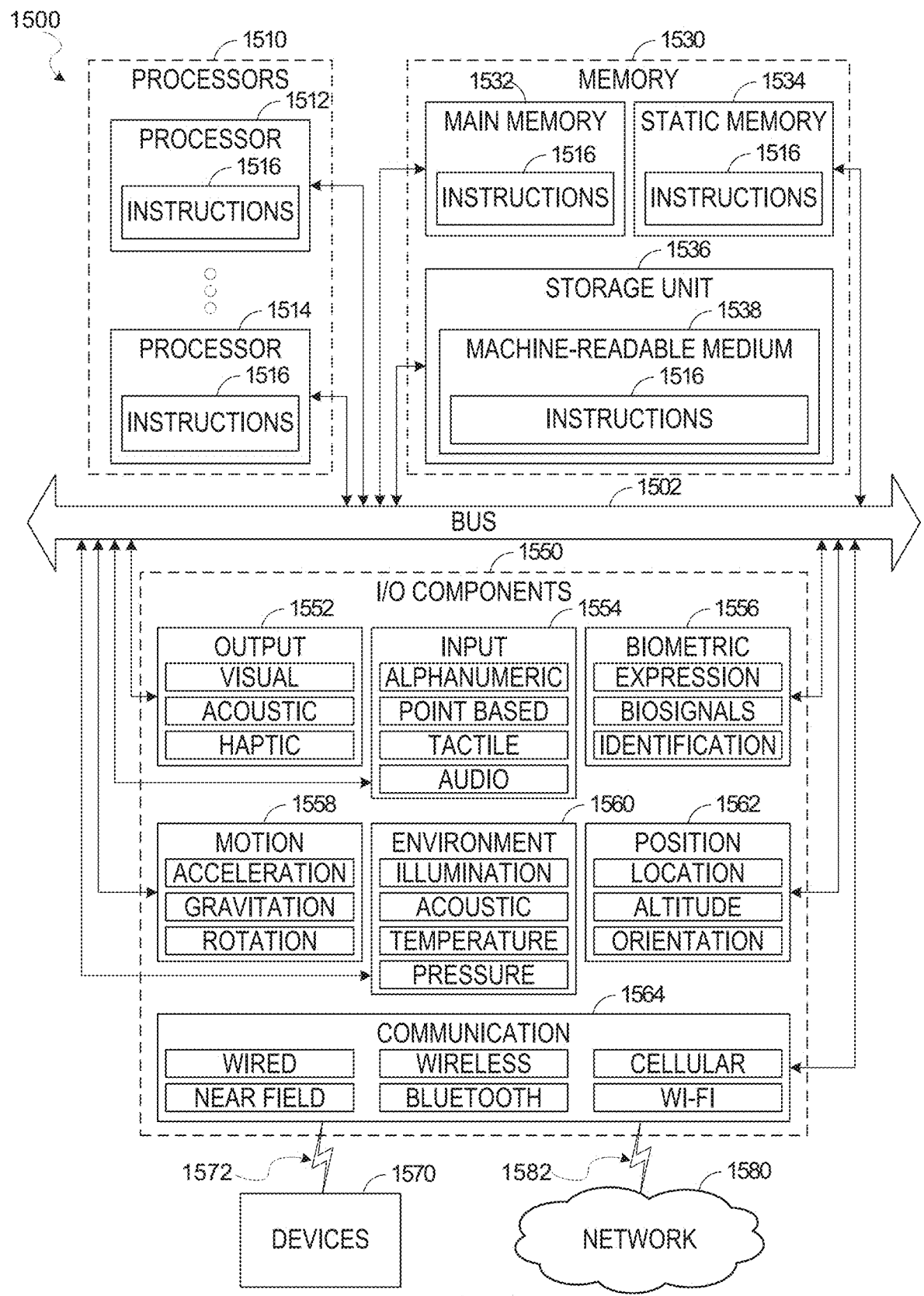
FIG. 15 shows a machine as an example computer system with instructions to cause the machine to implement the user message system, according to some example embodiments.

FIG. 15 illustrates a diagrammatic representation of a machine 1500 in the form of a computer system within which a set of instructions may be executed for causing the machine to perform any one or more of the methodologies discussed herein, according to an example embodiment. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but be not limited to, a server computer, a client computer, a PC, a tablet computer, a laptop computer, a netbook, an STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory 1530 may include a main memory 1532, a static memory 1534, and a storage unit 1536, all accessible to the processors 1510 such as via the bus 1502. The main memory 1532, the static memory 1534, and storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, Near Field Communication (NM) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

The various memories (i.e., 1530, 1532, 1534, and/or memory of the processor(s) 1510) and/or storage unit 1536 may store one or more sets of instructions and data structures (e.g., software) embodying or utilized by any one or more of the methodologies or functions described herein. These instructions (e.g., the instructions 1516), when executed by processor(s) 1510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1580 may be an ad hoc network, an intranet, an extranet, a VPN, an LAN, a WLAN, a WAN, a WWAN, an MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA) Worldwide Interoperability for Microwave Access (WiMAX), Long Term Evolution (LTE) standard, others defined by various standard-setting organizations, other long-range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The following are example embodiments:

Example 1. A method comprising: generating, on a database of a network site, a plurality of listings of accommodations, the plurality of listings provided to the network site by a plurality of posting users of the network site, a listing of the plurality of listings comprising a plurality of images of an accommodation of the listing, the listing comprising a default image that is set for display as a primary listing image in a listing layout to display search results from the network site; storing a plurality of feature categories to categorize one or more of the plurality of listings in a modified listing layout in response to a request to display the plurality of listings in a feature and location-based accommodation search on the network site; tagging one or more images of the plurality of images with the plurality of feature categories; receiving, by the network site, a first listings search request specifying a first requested category of the plurality of feature categories; causing, on a client device, display of first search results for the first listings search request in the modified listing layout, the modified listing layout comprising a geographic result window that is set to a first geographic size that comprises locations of listings from the first search results, a listing in the first search results categorized to the first requested category upon being rendered for display by replacing the default image of the listing with a tagged image of the first requested category in the listing; receiving, by the network site, a second listings search request specifying a second requested category of the plurality of feature categories; and causing, on the client device, display of second search results for the second listings search request in the modified listing layout, an additional listing in the second search results categorized to the second requested category upon being rendered for display by replacing an additional default image of the additional listing with an additional tagged image of the second requested category in the additional listing.

Example 2. The method of example 1, wherein the second search results are displayed in the geographic result window that is set to a second geographic size that comprises locations of listings in the second search results, the second geographic size of the geographic result window being larger than the first geographic size.

Example 3. The method of any of examples 1 or 2, further comprising expanding the geographic result window to the second geographic size in response to an insufficient quantity of the plurality of listings matching the second requested category and having a location within the first geographic size.

Example 4. The method of any of examples 1-3, wherein the first geographic size comprises a first distance extending from a geographic location of the client device.

Example 5. The method of any of examples 1-4, wherein the default image of the listing is selected by a posting user of the plurality of images as the primary listing image.

Example 6. The method of any of examples 1-5, wherein the request to display the plurality of listings in the feature and location-based accommodation search on the network site is received from a searching end-user that transmits the request to the network site using the client device.

Example 7. The method of any of examples 1-6, wherein the first search results and the second search results are displayed in the modified listing layout without modifying the plurality of listings in the database.

Example 8. The method of any of examples 1-7, wherein listings of the first search results are displayed in the modified listing layout using a network address parameter.

Example 9. The method of any of examples 1-8, wherein the network address parameter is a uniform resource locator (URL) parameter.

Example 10. The method of any of examples 1-9, wherein listings of the second search results are displayed in the modified listing layout using a different network address parameter.

Example 11. A system comprising: one or more processors of a machine; and a memory storing instruction that, when executed by the one or more processors, cause the machine to perform any of the methods of examples 1-10.

Example 12. A machine-readable storage device embodying instructions that, when executed by a machine, cause the machine to perform any of the methods of examples 1-10.

What is claimed is:

1. A method comprising:
   generating, on a database of a network site, a plurality of listings of accommodations, the plurality of listings provided to the network site by a plurality of posting users of the network site, a listing of the plurality of listings comprising a plurality of images of an accommodation of the listing, the listing comprising a default image that is set for display as a primary listing image in a listing layout to display search results from the network site;
   precomputing combinations for possible search requests for the plurality of listings to generate a 3D listing array;
   compressing the 3D listing array using bitmaps to generate a compressed 3D listing array;
   storing a plurality of feature categories to categorize one or more of the plurality of listings in a modified listing layout in response to a request to display the plurality of listings in a feature and location-based accommodation search on the network site;
   tagging one or more images of the plurality of images with the plurality of feature categories;
   receiving, by the network site, a first listings search request specifying a first requested category of the plurality of feature categories;
   generating first search results by performing a lookup for results in an index for the compressed 3D listing array based on the first listings search request;
   causing, on a client device, display of the first search results for the first listings search request in the modified listing layout, the modified listing layout comprising a geographic result window that is set to a first geographic size that comprises locations of listings from the first search results, a listing in the first search results categorized to the first requested category upon being rendered for display by replacing the default image of the listing with a tagged image of the first requested category in the listing;
   receiving, by the network site, a second listings search request specifying a second requested category of the plurality of feature categories;
   generating second search results by performing a lookup for results in an index for the compressed 3D listing array based on the second listings search request; and
   causing, on the client device, display of the second search results for the second listings search request in the modified listing layout, an additional listing in the second search results categorized to the second requested category upon being rendered for display by replacing an additional default image of the additional listing with an additional tagged image of the second requested category in the additional listing.

2. The method of claim 1, wherein the second search results are displayed in the geographic result window that is set to a second geographic size that comprises locations of listings in the second search results, the second geographic size of the geographic result window being larger than the first geographic size.

3. The method of claim 2, further comprising expanding the geographic result window to the second geographic size in response to an insufficient quantity of the plurality of listings matching the second requested category and having a location within the first geographic size.

4. The method of claim 2, wherein the first geographic size comprises a first distance extending from a geographic location of the client device.

5. The method of claim 1, wherein the default image of the listing is selected by a posting user of the plurality of images as the primary listing image.

6. The method of claim 1, wherein the request to display the plurality of listings in the feature and location-based accommodation search on the network site is received from a searching end-user that transmits the request to the network site using the client device.

7. The method of claim 1, wherein the first search results and the second search results are displayed in the modified listing layout without modifying the plurality of listings in the database.

8. The method of claim 1, wherein listings of the first search results are displayed in the modified listing layout using a network address parameter.

9. The method of claim 8, wherein the network address parameter is a uniform resource locator (URL) parameter.

10. The method of claim 8, wherein listings of the second search results are displayed in the modified listing layout using a different network address parameter.

11. A system comprising:
    one or more processors of a machine; and memory-storing instructions that, when executed by the one or more processors, cause the machine to perform operations comprising:

generating, on a database of a network site, a plurality of listings of accommodations, the plurality of listings provided to the network site by a plurality of posting users of the network site, a listing of the plurality of listings comprising a plurality of images of an accommodation of the listing, the listing comprising a default image that is set for display as a primary listing image in a listing layout to display search results from the network site;

precomputing combinations for possible search requests for the plurality of listings to generate a 3D listing array;

compressing the 3D listing array using bitmaps to generate a compressed 3D listing array;

storing a plurality of feature categories to categorize one or more of the plurality of listings in a modified listing layout in response to a request to display the plurality of listings in a feature and location-based accommodation search on the network site;

tagging one or more images of the plurality of images with the plurality of feature categories;

receiving, by the network site, a first listings search request specifying a first requested category of the plurality of feature categories;

generating first search results by performing a lookup for results in an index for the compressed 3D listing array based on the first listings search request;

causing, on a client device, display of the first search results for the first listings search request in the modified listing layout, the modified listing layout comprising a geographic result window that is set to a first geographic size that comprises locations of listings from the first search results, a listing in the first search results categorized to the first requested category upon being rendered for display by replacing the default image of the listing with a tagged image of the first requested category in the listing;

receiving, by the network site, a second listings search request specifying a second requested category of the plurality of feature categories;

generating second search results by performing a lookup for results in an index for the compressed 3D listing array based on the second listings search request; and causing, on the client device, display of the second search results for the second listings search request in the modified listing layout, an additional listing in the second search results categorized to the second requested category upon being rendered for display by replacing an additional default image of the additional listing with an additional tagged image of the second requested category in the additional listing.

12. The system of claim 11, wherein the second search results are displayed in the geographic result window that is set to a second geographic size that comprises locations of listings in the second search results, the second geographic size of the geographic result window being larger than the first geographic size.

13. The system of claim 12, further comprising expanding the geographic result window to the second geographic size in response to an insufficient quantity of the plurality of listings matching the second requested category and having a location within the first geographic size.

14. The system of claim 12, wherein the first geographic size comprises a first distance extending from a geographic location of the client device.

15. The system of claim 11, wherein the default image of the listing is selected by a posting user of the plurality of images as the primary listing image.

16. The system of claim 11, wherein the request to display the plurality of listings in the feature and location-based accommodation search on the network site is received from a searching end-user that transmits the request to the network site using the client device.

17. The system of claim 11, wherein the first search results and the second search results are displayed in the modified listing layout without modifying the plurality of listings in the database.

18. The system of claim 11, wherein listings of the first search results are displayed in the modified listing layout using a network address parameter.

19. The system of claim 18, wherein the network address parameter is a uniform resource locator (URL) parameter.

20. A machine-readable storage device embodying instructions that, when executed by a machine, cause the machine to perform operations comprising:

generating, on a database of a network site, a plurality of listings of accommodations, the plurality of listings provided to the network site by a plurality of posting users of the network site, a listing of the plurality of listings comprising a plurality of images of an accommodation of the listing, the listing comprising a default image that is set for display as a primary listing image in a listing layout to display search results from the network site;

precomputing combinations for possible search requests for the plurality of listings to generate a 3D listing array;

compressing the 3D listing array using bitmaps to generate a compressed 3D listing array;

storing a plurality of feature categories to categorize one or more of the plurality of listings in a modified listing layout in response to a request to display the plurality of listings in a feature and location-based accommodation search on the network site;

tagging one or more images of the plurality of images with the plurality of feature categories;

receiving, by the network site, a first listings search request specifying a first requested category of the plurality of feature categories;

generating first search results by performing a lookup for results in an index for the compressed 3D listing array based on the first listings search request;

causing, on a client device, display of the first search results for the first listings search request in the modified listing layout, the modified listing layout comprising a geographic result window that is set to a first geographic size that comprises locations of listings from the first search results, a listing in the first search results categorized to the first requested category upon being rendered for display by replacing the default image of the listing with a tagged image of the first requested category in the listing;

receiving, by the network site, a second listings search request specifying a second requested category of the plurality of feature categories;

generating second search results by performing a lookup for results in an index for the compressed 3D listing array based on the second listings search request; and causing, on the client device, display of the second search results for the second listings search request in the modified listing layout, an additional listing in the second search results categorized to the second requested category upon being rendered for display by replacing an additional default image of the additional listing with an additional tagged image of the second requested category in the additional listing.

\* \* \* \* \*